United States Patent
Elshafie et al.

(10) Patent No.: US 11,728,945 B2
(45) Date of Patent: Aug. 15, 2023

(54) UPLINK REFERENCE SIGNAL BUNDLING TECHNIQUES IN WIRELESS COMMUNICATIONS

(71) Applicant: QUALCOMM Incorporated, San Diego, CA (US)

(72) Inventors: Ahmed Elshafie, San Diego, CA (US); Hung Dinh Ly, San Diego, CA (US); Seyedkianoush Hosseini, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 17/397,720

(22) Filed: Aug. 9, 2021

(65) Prior Publication Data
US 2023/0044701 A1    Feb. 9, 2023

(51) Int. Cl.
*H04L 5/00* (2006.01)
*H04W 76/30* (2018.01)
*H04W 72/566* (2023.01)

(52) U.S. Cl.
CPC .......... *H04L 5/0048* (2013.01); *H04L 5/0007* (2013.01); *H04W 72/569* (2023.01); *H04W 76/30* (2018.02)

(58) Field of Classification Search
CPC ... H04L 5/0048; H04L 5/0007; H04L 5/0005; H04L 5/0008; H04L 5/001; H04L 5/0012; H04L 5/005; H04L 5/0051; H04W 76/30; H04W 72/569; H04W 72/56
See application file for complete search history.

(56) References Cited

U.S. PATENT DOCUMENTS

| | | | |
|---|---|---|---|
| 2018/0368169 A1* | 12/2018 | Jung | H04W 72/23 |
| 2019/0254081 A1* | 8/2019 | Li | H04L 1/1607 |
| 2019/0268127 A1* | 8/2019 | Hosseini | H04L 5/0053 |
| 2019/0319757 A1* | 10/2019 | Manolakos | H04L 1/0003 |

* cited by examiner

*Primary Examiner* — Ian N Moore
*Assistant Examiner* — Brian T Le
(74) *Attorney, Agent, or Firm* — Holland & Hart LLP

(57) ABSTRACT

Methods, systems, and devices for wireless communications are described in which a user equipment (UE) may perform uplink reference signal bundling for access link communications and transmit sidelink communications using time or frequency division multiplexed resources. The UE may determine to drop or to transmit a sidelink communication based on a relationship with multiple instances of an uplink reference signal that are to maintain phase continuity. The UE may drop a sidelink communication when a time duration between two instances of the uplink reference signal is less than or equal to a time threshold value, and may transmit the sidelink communication when the time duration exceeds the time threshold value. In frequency division multiplexed cases, the UE may set a transmission power for each instance of the uplink reference signal, and the sidelink communication may use a remaining amount of power.

30 Claims, 20 Drawing Sheets

UPLINK REFERENCE SIGNAL BUNDLING TECHNIQUES IN WIRELESS COMMUNICATIONS

FIELD OF TECHNOLOGY

The following relates to wireless communications, including uplink reference signal bundling techniques in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support both access link and sidelink communications between devices. An access link refers to a communication link between a UE and a network node (e.g., a base station), and in some cases may be referred to as a Uu interface. Specifically, the Uu interface may refer to an over-the-air interface for downlink transmissions, uplink transmissions, or both. A sidelink refers to a communication link between similar devices (e.g., between multiple UEs) and in some cases may be referred to as a PC5 interface. For example, a sidelink may support communications between multiple UEs (e.g., in a vehicle-to-everything (V2X) system, a vehicle-to-vehicle (V2V) system, a device-to-device (D2D) system, among other examples). Access link and sidelink communications may share wireless resources, such as through time division multiplexing (TDM), frequency division multiplexing (FDM), or both. Efficient and reliable techniques for managing various access link communications and sidelink communications enhance network efficiency and reliability.

SUMMARY

The described techniques relate to improved methods, systems, devices, and apparatuses that support uplink reference signal bundling techniques in wireless communications. In various aspects discussed herein, described techniques provide for uplink coverage enhancement through combining or bundling uplink reference signals to enhance channel estimation across multiple instances of the uplink reference signals, while also supporting sidelink communications or other uplink communications. In some cases, a user equipment (UE) may be configured to transmit multiple instances of an uplink reference signal, such as a demodulation reference signal (DMRS) transmitted in an uplink shared channel, in which phase continuity is maintained across the multiple instances. In cases where a sidelink communication is time division multiplexed or frequency division multiplexed with one or more instances of the uplink reference signal, the UE may determine to drop or to transmit the sidelink communication based on a relationship with one or more instances of the uplink reference signal.

In some cases, the UE may drop a sidelink communication that is time division multiplexed between two instances of the uplink reference signal when a time duration between the two instances of the uplink reference signal is less than or equal to a time threshold value; and the UE may transmit the sidelink communication when the time duration exceeds the time threshold value. In other cases, a UE may determine one or more uplink transmission powers for a sidelink communication and two or more uplink communications when the sidelink communication is frequency division multiplexed with one or more instances of an uplink reference signal in the two or more uplink communications. In some cases, the sidelink communication may use an amount of power that remains after providing sufficient power to the uplink transmissions to maintain phase continuity across the two or more instances of the uplink reference signal. In other cases, one of the sidelink communication or an uplink communication may be dropped (e.g., based on a priority of the associated communication).

DETAILED DESCRIPTION

Figure 1:
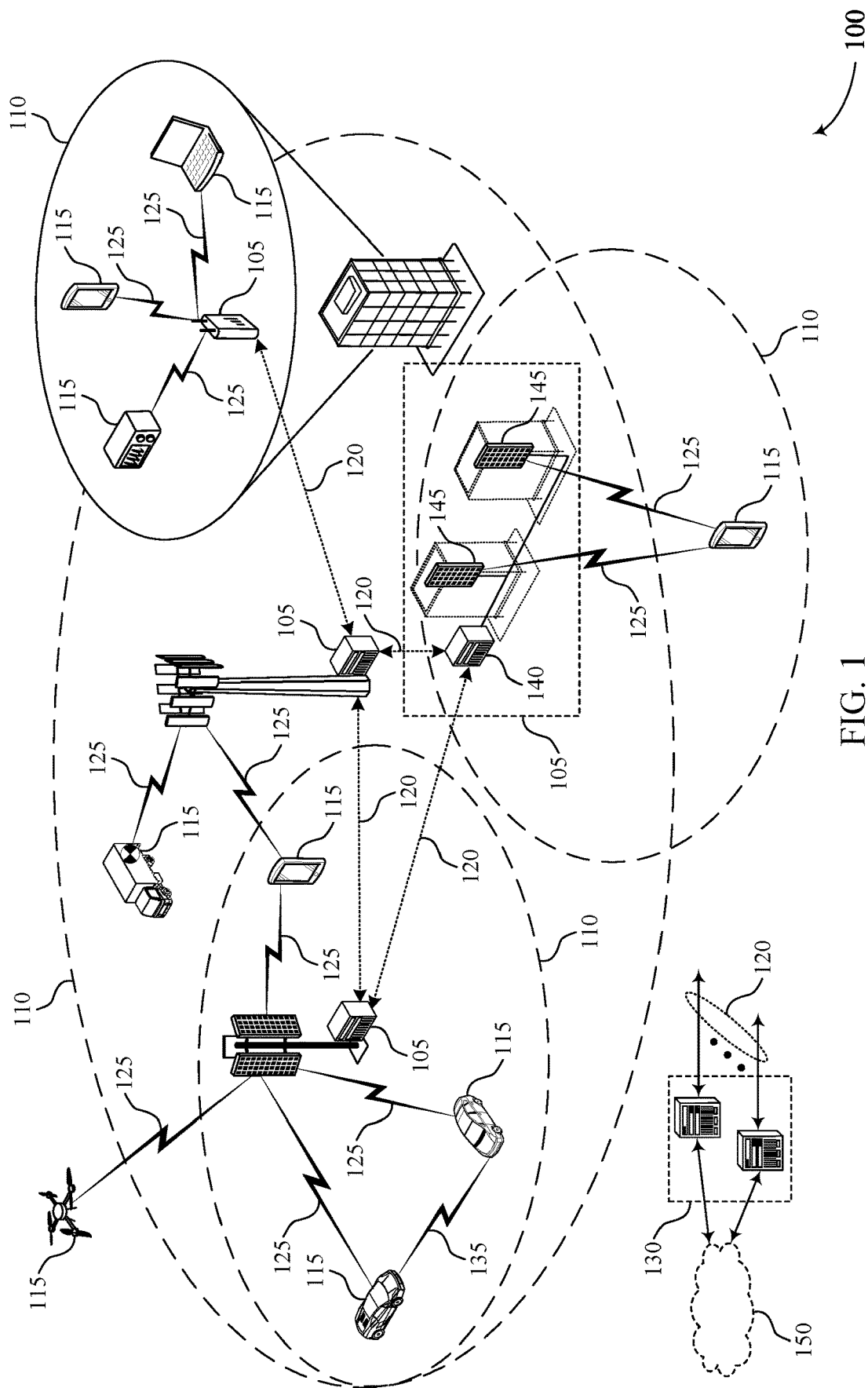
FIG. 1 illustrates an example of a wireless communications system that supports uplink reference signal bundling techniques in wireless communications in accordance with aspects of the present disclosure.

Some wireless communications systems, such as fifth generation (5G) systems, which may be referred to as New Radio (NR) systems, may support both access link and sidelink communications between devices. An access link (e.g., a Uu interface) may refer to a communication link between a network node (e.g., a base station) and a user equipment (UE). A sidelink (e.g., a PC5 interface) may refer to a communication link between user, relay, or end devices (e.g., a communication link between UEs). It is noted that while various examples provided herein are discussed for UE sidelink devices, such sidelink techniques may be used for any type of wireless devices that use sidelink communications. For example, a sidelink may support device-to-device (D2D) communications, vehicle-to-everything (V2X) or vehicle-to-vehicle (V2V) communications, message relaying, discovery signaling, beacon signaling, integrated access and backhaul (IAB) communications, or any combination of these or other signals transmitted over-the-air between devices.

In some examples, access link and sidelink communications may use a same frequency band (e.g., a licensed band), and sidelink communications may occur using a same set of wireless resources as access link communications. In such cases, sidelink communications and access link communications may use time division multiplexing (TDM) or frequency division multiplexing (FDM) techniques. Further sidelink communications may be configured as mode one sidelink in which a network node (e.g., a base station) determines resource allocations for access link and sidelink communications, or the sidelink communications may be configured as mode two sidelink in which UEs determine sidelink resources autonomously. In mode two sidelink, a base station or other network node may be unaware of resources that a UE may select for sidelink communications.

Additionally, in some cases access link communications and sidelink communications may employ one or multiple coverage enhancement techniques to help enhance reliability of the link. One such coverage enhancement technique may provide transport block (TB) processing over multiple slots of a physical uplink shared channel (PUSCH) or a physical uplink control channel (PUCCH), or a physical sidelink shared channel (PSSCH), and joint channel estimation over the multiple slots may be provided by transmitting multiple instances of an uplink reference signal (e.g., a demodulation reference signal (DMRS)) that have power consistency and phase continuity (which may be referred to as DMRS bundling). It is noted that while various examples discussed herein refer to multiple instances of an uplink reference signal that may be TDM'ed/FDM'ed with a sidelink communication, techniques discussed herein may be applied in other cases that employ reference signal bundling, such as reference signal bundling for sidelink communications (e.g., DMRS bundling in PSSCH), cases where configured grants are present on an access link or sidelink that uses DMRS bundling, etc.

By providing multiple instances of the uplink reference signal, a receiving device (e.g., a base station) may jointly process the reference signal instances in multiple uplink transmissions (e.g., across two or more PUSCH transmissions or two or more PUCCH transmissions). In some cases, in order to maintain phase continuity across multiple DMRS instances, a UE may use a same frequency resource allocation, a same transmit power, and a same spatial transmission relation, set of antenna ports, and precoding. However, in cases where sidelink communications may share resources with access link communications, the TDM or FDM relationship between sidelink and access link communications may disrupt phase continuity between consecutive instances of an uplink reference signal. For example, if a sidelink communication is located in time domain resources between two instances of an uplink reference signal, the transmitting UE may be unable to switch between the access link and sidelink and maintain reference signal phase continuity. Or, if a sidelink communication is FDM'ed with an access link communication, the transmitting UE may use different power allocations for different instances of the access link communication.

In accordance with various aspects of the present disclosure, a UE may determine to drop or to transmit a sidelink communication that is TDM'ed or FDM'ed with multiple instances of an uplink reference signal in an access link communication based on a relationship with one or more instances of the uplink reference signal. In some cases, the UE may drop a sidelink communication that is time division multiplexed between two instances of the uplink reference signal when a time duration between the two instances of the uplink reference signal is less than or equal to a time threshold value; and the UE may transmit the sidelink communication when the time duration exceeds the time threshold value. In other cases, a UE may determine one or more uplink transmission powers for a sidelink communication and two or more uplink communications when the sidelink communication is frequency division multiplexed with one or more instances of an uplink reference signal in the two or more uplink communications. In some cases, the sidelink communication may use an amount of power that remains after providing sufficient power to the uplink transmissions to maintain phase continuity across the two or more instances of the uplink reference signal. In other cases, one of the sidelink communication or an uplink communication may be dropped (e.g., based on a priority of the associated communication).

Particular aspects of the subject matter described herein may be implemented to realize one or more of the following potential advantages. The techniques employed by the described wireless communications systems may provide benefits and enhancements to the operation of the wireless communications system. For example, the described techniques may include features improving reliability of communications by providing joint processing of multiple instances of a communication, and also providing for transmitting or dropping one or more other transmissions that may disrupt phase continuity associated with the joint processing. The described techniques include additional features for improving resource use, power consumption, battery life, and throughput, among other benefits.

Aspects of the disclosure are initially described in the context of wireless communications systems. Aspects of the disclosure are further illustrated by and described with reference to wireless resource examples, process flows, apparatus diagrams, system diagrams, and flowcharts that relate to uplink reference signal bundling techniques in wireless communications.

FIG. 1 illustrates an example of a wireless communications system 100 that supports uplink reference signal bundling techniques in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, a UE 115 may be configured for both sidelink and access link communications, and for coverage enhancement through joint processing of multiple TBs and DMRS bundling. In some cases, a UE 115 may determine to drop or to transmit a sidelink communication that is TDM'ed or FDM'ed with multiple instances of an uplink reference signal in an access link communication based on a relationship with one or more instances of the uplink reference signal. In some cases, the UE 115 may drop a sidelink communication that is TDM'ed with instances of the uplink reference signal when a time duration between the two instances of the uplink reference signal is less than or equal to a time threshold value; and the UE 115 may transmit the sidelink communication when the time duration exceeds the time threshold value. In other cases, a UE 115 may determine one or more uplink transmission powers for a sidelink communication and two or more uplink communications when the sidelink communication is FDM'ed with one or more instances of an uplink reference signal in the two or more uplink communications. In some cases, the sidelink communication may use an amount of power that remains after providing sufficient power to the uplink transmissions to maintain phase continuity across the two or more instances of the uplink reference signal. In other cases, one of the sidelink communication or an uplink communication may be dropped (e.g., based on a priority of the associated communication).

Figure 2:
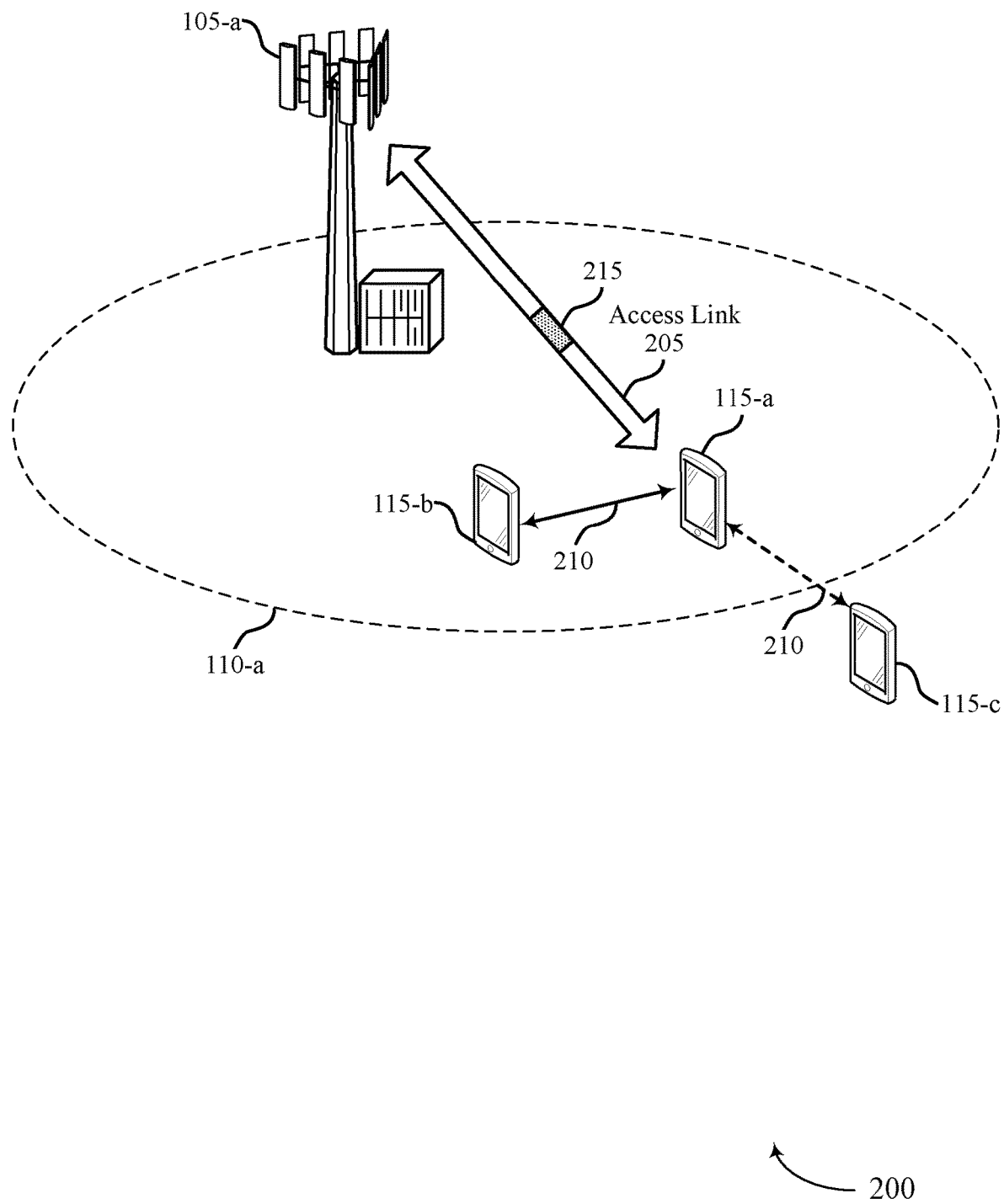
FIG. 2 illustrates an example of a portion of a wireless communications system that supports uplink reference signal bundling techniques in wireless communications in accordance with aspects of the present disclosure.

FIG. 2 illustrates an example of a wireless communications system 200 that supports uplink reference signal bundling techniques in wireless communications in accordance with aspects of the present disclosure. In some examples, the wireless communications system 200 may implement one or more aspects of a wireless communications system 100 as described with reference to FIG. 1. The wireless communications system 200 may include a first UE 115-*a*, a second UE 115-*b*, and a third UE 115-*c*, which may be examples of a UE 115 as described with reference to FIG. 1. The wireless communications system 200 may also include a base station 105-*a* which may be an example of a base station 105 as described with reference to FIG. 1. The base station 105-*a* may be associated with a cell that provides wireless communications service within a coverage area 110-*a*.

In some examples, the base station 105-*a* may communicate with the first UE 115-*a* via an access link 205 (e.g., a Uu interface). In the example of FIG. 2, the first UE 115-*a*, the second UE 115-*b*, and the third UE 115-*c* may communicate via sidelinks 210 which may be examples of a PC5 interface. It is noted that, in some examples, UEs 115 operating using sidelink communications via sidelinks 210 may be in or out of coverage for communications with the base station 105-*a*. For example, the third UE 115-*c* may not be within coverage area 110-*a* of the base station 105-*a*, but may have established sidelink 210 with one or more other UEs 115 (e.g., according to sidelink mode 2 operation). Further, one or more UEs 115 may be within the coverage area 110-*a* but may not have an access link connection, such as second UE 115-*b* that, even though it is within the coverage area 110-*a* of the base station 105-*a*, may not have an access link connection.

In some cases, the access link 205 with the first UE 115-*a* may use one or more coverage enhancement techniques, such as joint processing of repetitions of a TB using DMRS bundling, for uplink communications 215 with the base station 105-*a*. In cases where the sidelinks 210 may share resources with access link 205 communications, the UEs 115 may operate in sidelink mode 1 or mode 2. In sidelink mode 2, for example, the first UE 115-*a* may perform resource sensing to determine resources for a sidelink transmission which may be TDM or FDM with one or more instances of the uplink communications 215, such that the base station 105-a may not be aware of the sidelink resources of mode 2 for the sidelink transmission. In other examples, techniques as discussed herein may be applied for configured grants (e.g., type 1 and type 2 configured grants) and SL mode 1.

As discussed herein, for DMRS bundling in the access link 205, the first UE 115-a may need to maintain phase continuity across multiple instances of a DMRS in uplink communications 215. The presence of a sidelink transmission during a time-domain window for the DMRS bundling may impact such phase continuity feasibility. Similarly, for DMRS bundling across PSSCH transmissions, the presence of access link 205 uplink transmissions during a time-domain window for the bundling may impact such phase continuity feasibility. In some cases, from the base station 105-a point of view, mode 2 sidelink transmissions may be treated as unscheduled symbols, and as long as a time duration between two adjacent uplink transmissions is within a time threshold value (e.g., <14 symbols), the base station 105-a may assume that the first UE 115-a maintains phase continuity between instances of DMRS transmissions. Further, the base station 105-a may assume that the first UE 115-a will not run its power amplifier when the time duration between DMRS instances is beyond a time threshold value (e.g., 14 symbols). Thus, in such cases, the base station 105-a may assume the first UE 115-a maintains phase continuity between instances of a DMRS that are less than or equal to the time threshold value (e.g., ≤14 symbols), and that the first UE 115-a does not maintain phase continuity if the time between DMRS instances exceeds the time threshold value (e.g., >14 symbols).

Based on such relationships, in TDM cases, when a sidelink transmission (or a different uplink transmissions, such as a configured grant or semi-persistent scheduling transmission) is between two DMRS instances of a bundled DMRS, whether to transmit or drop the sidelink transmission is based on a time threshold (e.g., 14 symbols) between DMRS instances. If the time between DMRS instances is greater than the time threshold, the sidelink transmission is transmitted, and in cases where the time between DMRS instances is less than the time threshold, the first UE 115-a may drop the sidelink transmission. In other cases, the sidelink transmission may be dropped or phase continuity not maintained based on a relative priority of the sidelink and uplink traffic. In further cases, based on a capability of the first UE 115-a, phase continuity may be maintained and the sidelink transmission may be transmitted. Examples of TDM cases are discussed with reference to FIGS. 3 and 4.

In cases where uplink communications 205 may be FDM with a sidelink communication, the first UE 115-a may set uplink transmit power for the uplink communications 215 at a fixed power level to enable DMRS bundling, and remaining power may be used for the sidelink transmission. In other cases, the first UE 115-a may drop the sidelink transmission to maintain phase continuity of the DMRS instances. In further cases, the first UE 115-a may not maintain phase continuity, which may be indicated to the base station (e.g., in UCI). Additionally, in still further cases, the first UE 115-a may drop an instance of uplink communications 215 based on the particular instance being a repetition of a prior transmission, a priority of the uplink and sidelink communications, or any combinations thereof. Examples of FDM cases are discussed with reference to FIG. 5.

Figure 3:
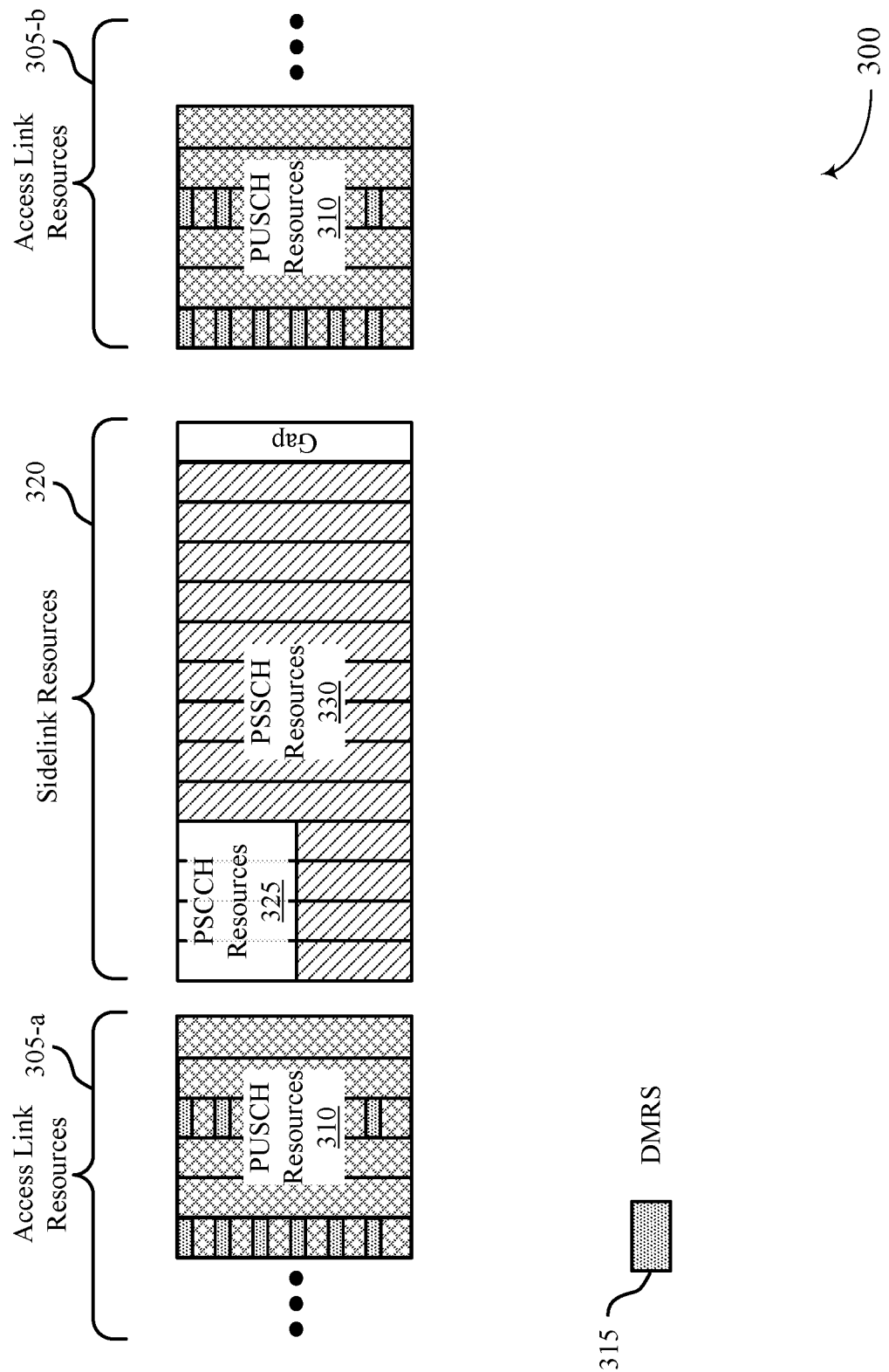
FIGS. 3 through 5 illustrate examples of access link resources and sidelink resources that support uplink reference signal bundling techniques in wireless communications in accordance with aspects of the present disclosure.

FIG. 3 illustrates an example of access link resources and sidelink resources 300 that support uplink reference signal bundling techniques in wireless communications in accordance with aspects of the present disclosure. In some examples, the access link resources and sidelink resources 300 may be implemented in aspects of a wireless communications systems 100 or 200.

In this example, access link resources 305 may be allocated to a UE (e.g., a UE 115 as discussed herein) for access link communications. The access link communications may employ one or more types of coverage enhancement, such as joint processing of multiple instances of a transmission and DMRS bundling. In this example, PUSCH resources 310 may include an uplink data transmission, and multiple instances of DMRS 315 may be provided. By providing multiple instances of the DMRS, a receiving device (e.g., a base station 105 as discussed herein) may jointly process the DMRS instances in the multiple PUSCH transmissions of the access link resources 305 (e.g., or across two or more PUCCH transmissions). In some cases, in order to maintain phase continuity across multiple DMRS 315 instances, a UE may use a same frequency resource allocation, a same transmit power, and a same spatial transmission relation, set of antenna ports, and precoding.

Figure 4:
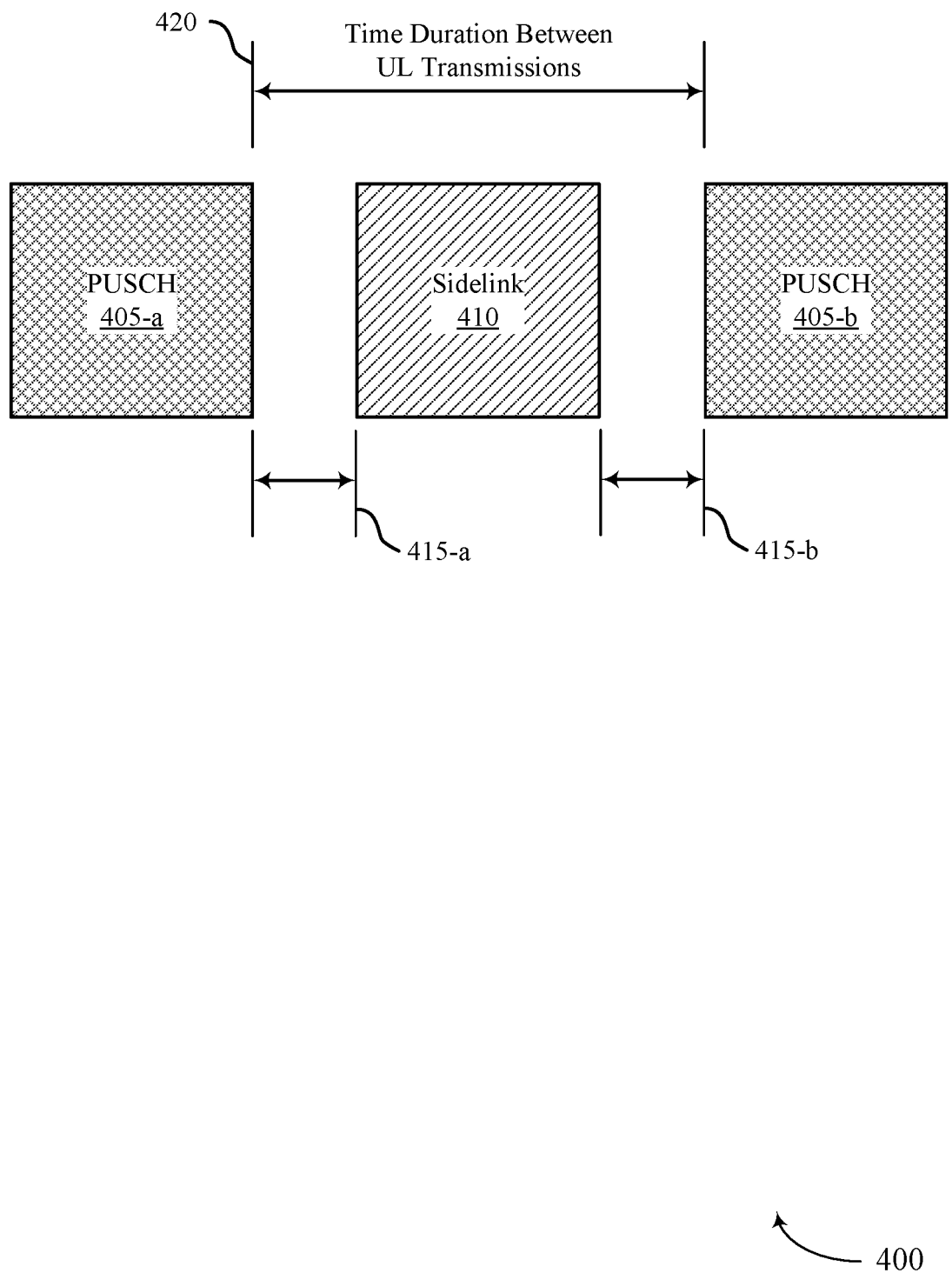

In this example, sidelink resources 320 may be located between first access link resources 305-a and second access link resources 305-b. The sidelink resources 320 may include physical sidelink control channel (PSCCH) resources 325 and physical sidelink shared channel (PSSCH) resources 330. As discussed herein, in some cases a UE that identified the sidelink resources 320 may determine to transmit using the sidelink resources 320 or to drop the sidelink transmission based on a time duration between the first access link resources 305-a and the second access link resources 305-b as illustrated in the example of FIG. 4. In some cases, additionally or alternatively, the UE may determine to transmit/drop the sidelink transmission or transmit/drop an access link transmission based on a priority associated with the different transmissions (e.g., an access link transmission may be dropped if the sidelink communication is a high priority V2X safety-related communication), whether one of the transmissions is a repetition transmission, or any combinations thereof.

FIG. 4 illustrates an example of access link resources and sidelink resources 400 that support uplink reference signal bundling techniques in wireless communications in accordance with aspects of the present disclosure. In some examples, the access link resources and sidelink resources 400 may be implemented in aspects of a wireless communications systems 100 or 200.

In this example, PUSCH resources 405 may be allocated to a UE (e.g., a UE 115 as discussed herein) for access link communications and may use DMRS bundling across first PUSCH resources 405-a and second PUSCH resources 405-b. The UE may identify sidelink resources 410 (e.g., according to a sidelink mode 2 resource identification procedure) that occupy time domain resources between the first PUSCH resource 405-a and the second PUSCH resources 405-b. In this example, a gap of unscheduled symbols 415 may be present between the sidelink resources 410 and the PUSCH resources 405. Based on the time domain location of the sidelink resources 410 and the PUSCH resources 405, the UE may determine whether to drop or transmit a sidelink communication using the sidelink resources 410.

In some cases, such a determination may be made based on a time duration 420 between uplink transmissions in the PUSCH resources 405. In this example, if the time duration exceeds a time threshold value (e.g., 14 symbols, one or more slots, etc.), the UE does not drop the sidelink transmission on the sidelink resources 410. For example, such a threshold value may be based on the UE not keeping a power amplifier active for longer than the time threshold value, and thus the serving base station may not assume that instances of the DMRS across the PUSCH resources 405 have phase continuity. Since phase continuity is assumed to be disrupted, transmission of the sidelink communications does not impact the uplink transmission reliability, and network efficiency may be enhanced through scheduling of the sidelink resources 410.

In cases where the time duration 420 is less than or equal to the time threshold value (e.g., ≤14 symbols), the UE may drop the sidelink transmissions using sidelink resources 410 and maintain uplink phase continuity. In some cases, whether to drop the sidelink transmission may be further based on a priority of the sidelink communication relative to the uplink communication (e.g., sidelink is dropped if it has an equal or lower priority than the uplink communication). In other cases, the UE may not maintain phase continuity across transmissions of the PUSCH resources 405, and may transmit both instances of the uplink transmission (without phase continuity) and the sidelink transmission. In further cases, based on a capability of the UE that may be reported to a serving base station or other network entity), the UE may maintain the phase coherency on the access link even after switching for transmission using sidelink resources 410, and thus phase continuity is maintained and sidelink transmissions are not dropped.

Figure 5:
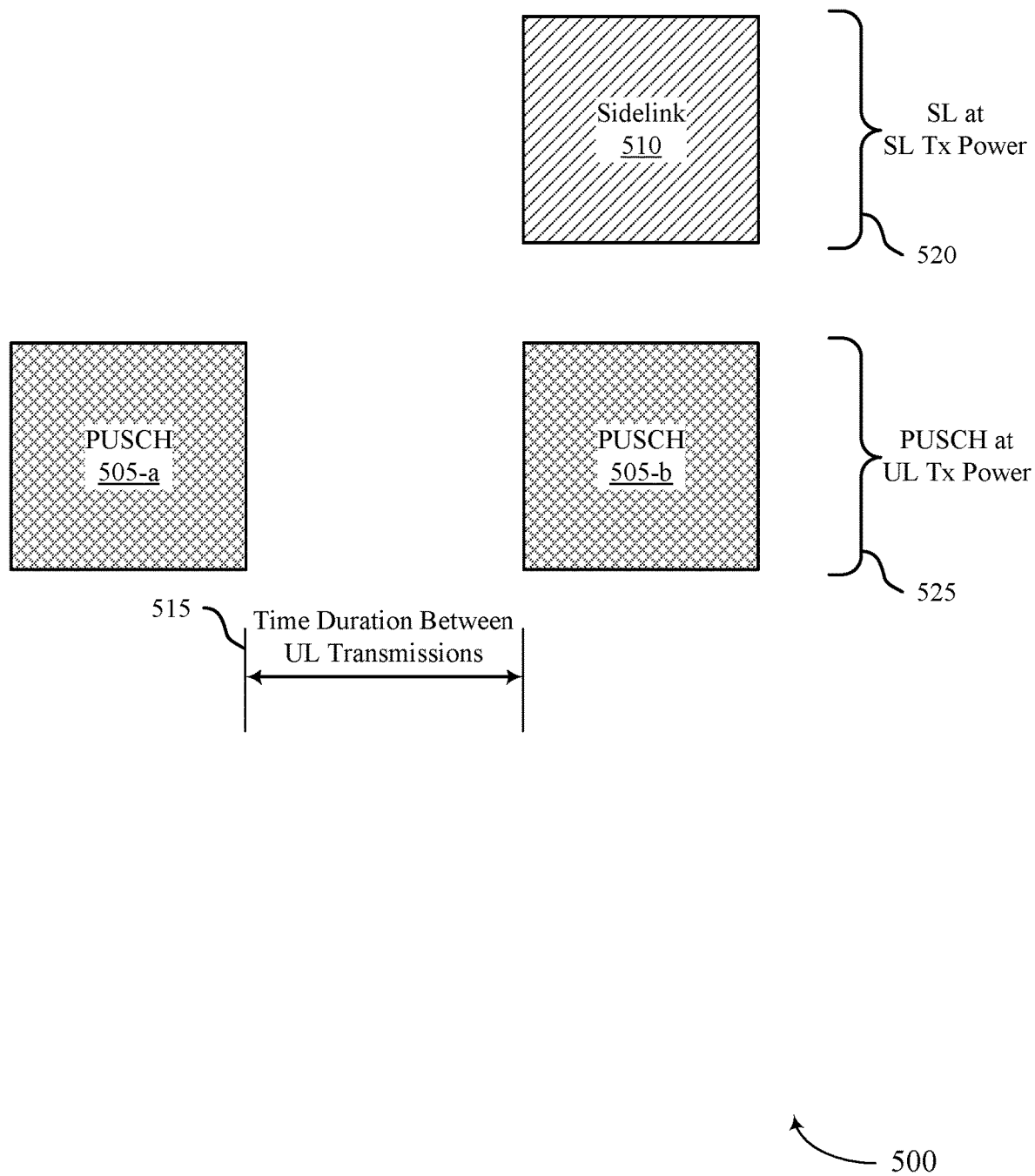

FIG. 5 illustrates an example of access link resources and FDM sidelink resources 500 that support uplink reference signal bundling techniques in wireless communications in accordance with aspects of the present disclosure. In some examples, the access link resources and sidelink resources 500 may be implemented in aspects of a wireless communications systems 100 or 200.

In this example, PUSCH resources 505 may be allocated to a UE (e.g., a UE 115 as discussed herein) for access link communications and may use DMRS bundling across first PUSCH resources 505-*a* and second PUSCH resources 505-*b*. The UE may identify sidelink resources 510 (e.g., according to a sidelink mode 2 resource identification procedure) that occupy frequency domain resources that are FDM with frequency domain resources of the second PUSCH resources 505-*b*. In this example, a time duration 515 may be present between instances of the PUSCH resources 505. Based on the frequency domain location of the sidelink resources 510 and the second PUSCH resources 505-*b*, the UE may determine whether to drop or transmit a sidelink communication using the sidelink resources 510, whether to drop or transmit an access link communication using second PUSCH resources 505-*b*, or whether to adjust one or more transmission parameters of the sidelink or access link transmissions.

In some cases, the UE may set an uplink transmission power for uplink transmissions in each of the PUSCH resources 505 to a fixed level to enable bundling for each PUSCH at an uplink transmit power 525. Remaining power may then be used for the sidelink transmission at a sidelink transmission power 520 using the sidelink resources 510. In such cases, the UE may transmit both the access link communications with DMRS bundling as well as sidelink transmissions, and thus system efficiency and reliability may be enhanced. In other cases, the UE may drop the sidelink transmission using sidelink resources 510. In some cases, the determination to drop the sidelink transmission may be based on an amount of power that remains after setting the uplink transmission power. In other cases, the determination to drop the sidelink transmission may be based on a priority of the sidelink transmission. In further cases, the UE may determine to not maintain phase continuity between instances of DMRS transmissions, and the UE may transmit both the sidelink and access link communications. In some cases, the UE may indicate to the base station that there is no phase continuity (e.g., via an uplink control information (UCI) transmission), although in other cases the UE may not provide an indication that phase continuity is disrupted. In further cases, the UE may determine that the uplink transmission associated with the second PUSCH resources 505-*b* may be dropped, and then transmit the sidelink communication using sidelink resource 510. For example, the UE may determine that the uplink transmission of the second PUSCH resources 505-*b* is a repetition transmission, and may determine to drop the transmission. In some cases, such a determination may be based on channel conditions between the UE and the base station (e.g., based on reference signal received power (RSRP) measurements, a signal to noise ratio (SNR), etc.), a success rate for communications with the base station (e.g., a number of percentage of negative acknowledgments (NACKs) received within a prior time period), or any combinations thereof.

Figure 6:
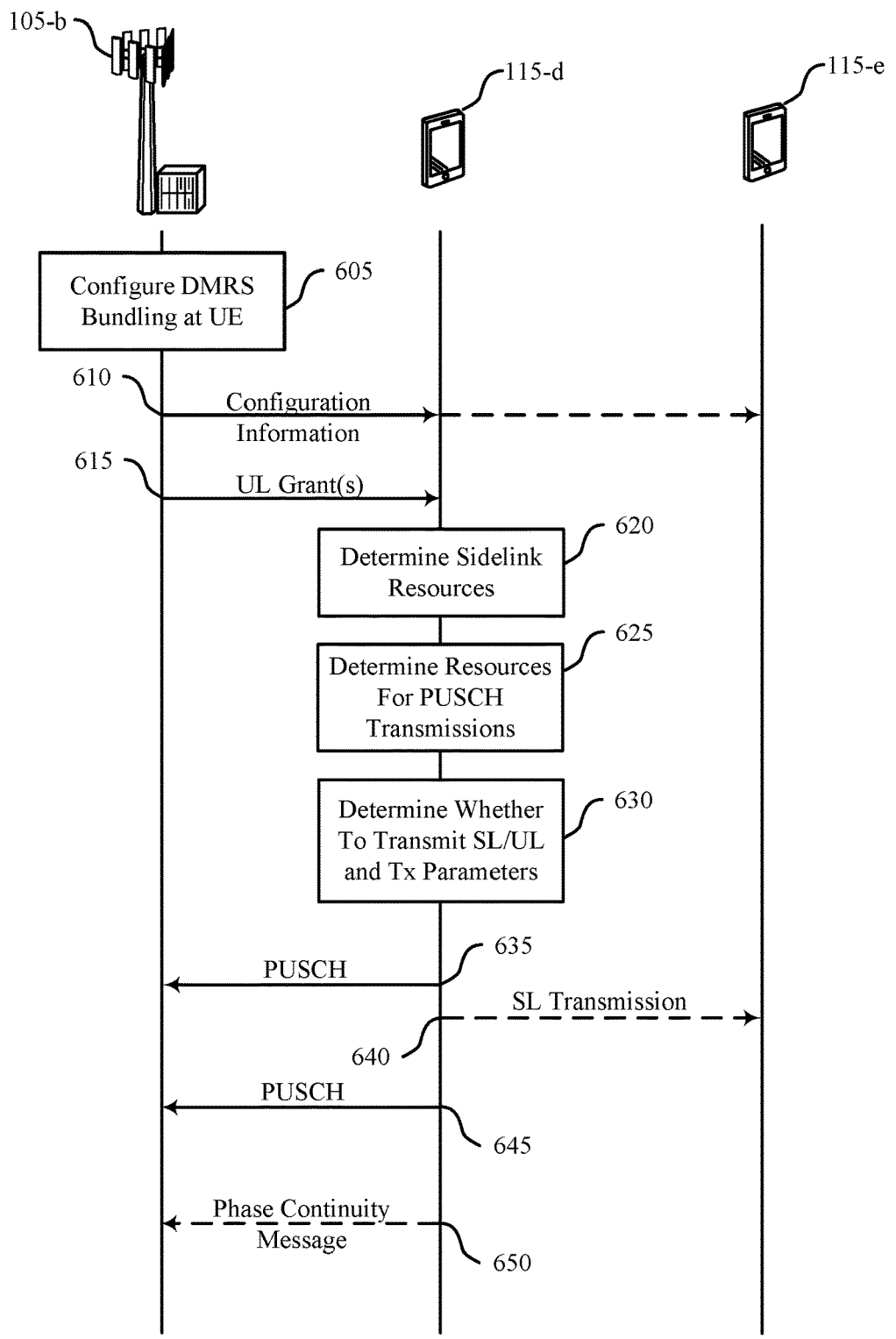
FIG. 6 illustrates an example of a process flow that supports uplink reference signal bundling techniques in wireless communications in accordance with aspects of the present disclosure.

FIG. 6 illustrates an example of a process flow 600 that supports uplink reference signal bundling techniques in wireless communications in accordance with aspects of the present disclosure. In some examples, the process flow 600 may implement aspects of a wireless communications systems 100 or 200, may implement aspects described in examples of access link resources and sidelink resources 300, 400, or 500, or any combination thereof as described with reference to FIGS. 1-5. The process flow 600 may include a base station 105-*b*, a first UE 115-*d*, and a second UE 115-*e*, which may be examples of the corresponding devices described herein. Alternative examples of the following may be implemented where some processes are performed in a different order than described or not performed at all. In some implementations, processes may include additional features not mentioned below, or further processes may be added.

At 605, the base station 105-*b* may configure DMRS bunding at the first UE 115-*d*. In some cases, the DMRS bundling may be configured based on coverage enhancement techniques for joint processing of multiple instances of DMRS transmissions in uplink shared channel or uplink data transmissions. In some cases, the DMRS bundling configuration may include a time threshold value that the base station 105-*b* may use to determine whether to assume two instances of a DMRS have phase continuity or not. At 610, the base station 105-*b* may transmit configuration information to the first UE 115-*d* and optionally to the second UE 115-*e*.

At 615, the base station 105-*b* may transmit one or more uplink grants to the first UE 115-*d*. In some cases, the one or more uplink grants may provide access link resources for multiple instances of one or more uplink transmissions, that may include multiple instances of an uplink reference signal (e.g., DMRS), where phase continuity of the multiple instances of the uplink reference signal is to be maintained.

At 620, the first UE 115-*d* may determine sidelink resources for sidelink communications with the second UE 115-*e* and optionally one or more other UEs. In some cases, the sidelink resources may be determined at the first UE 115-d based on a mode 2 sidelink configuration in which UEs determine sidelink resources for sidelink communications.

At 625, the first UE 115-d may determine resources for PUSCH transmissions. Such a determination may be made based on the uplink grants provided to the first UE 115-d for one or more uplink transmissions. In some cases, the first UE 115-d may determine that the resources for PUSCH transmissions are to include multiple instances of an uplink reference signal that are to be transmitted with phase continuity.

At 630, the first UE 115-d may determine whether to transmit the sidelink transmission or one or more uplink transmissions, and one or more transmission parameters. In some case, when the sidelink resources are TDM with the uplink resources, the first UE 115-d may determine to drop the sidelink transmission when a time duration between instances of the uplink reference signal is less than or equal to a time threshold value, and the first UE 115-d may determine to transmit the sidelink transmission when the time duration exceeds the time threshold value. In some cases, additionally or alternatively, the first UE 115-d may determine to transmit the sidelink transmission based on a priority of the sidelink transmission relative to a priority of the uplink transmission associated with an instance of the uplink reference signal (e.g., a high priority safety message or ultra-reliable low latency communication (URLLC) in sidelink may have higher priority than an enhanced mobile broadband (eMBB) uplink transmission). In other cases, when the sidelink resources are FDM with uplink resources that include an instance of the uplink reference signal, the first UE 115-d may determine a transmission power for each instance of uplink transmissions such that a uniform transmit power across uplink reference instances is provided, and remaining uplink power may be used for the sidelink transmission. In other cases, the first UE 115-d may determine that phase continuity of the uplink reference signal is not to be maintained, and the different instances of the uplink reference signal may be transmitted at different powers (e.g., based on a priority of the sidelink and uplink transmissions).

At 635, the first UE 115-d may transmit a first instance of PUSCH to the base station 105-b, and at 645 the first UE 115-d may transmit a second instance of PUSCH to the base station 105-b. In some cases, as discussed herein, the first and second instances of PUSCH may include instances of an uplink reference that have phase continuity. In some cases, as discussed herein, the first UE 115-d may drop an uplink transmission (e.g., based on a priority), or may not maintain phase continuity between instances of the uplink reference signal.

At 640, the first UE 115-d may transmit the sidelink communication in cases where the first UE 115-d determines that the sidelink communication is to be transmitted. Optionally, at 650, the first UE 115-d may transmit a phase continuity message (e.g., an uplink control information indication) that indicates that phase continuity of different instances of an uplink reference signal is not maintained. In some cases, the phase continuity message may be transmitted with one of the PUSCH transmissions, or may be transmitted separately.

Figure 7:
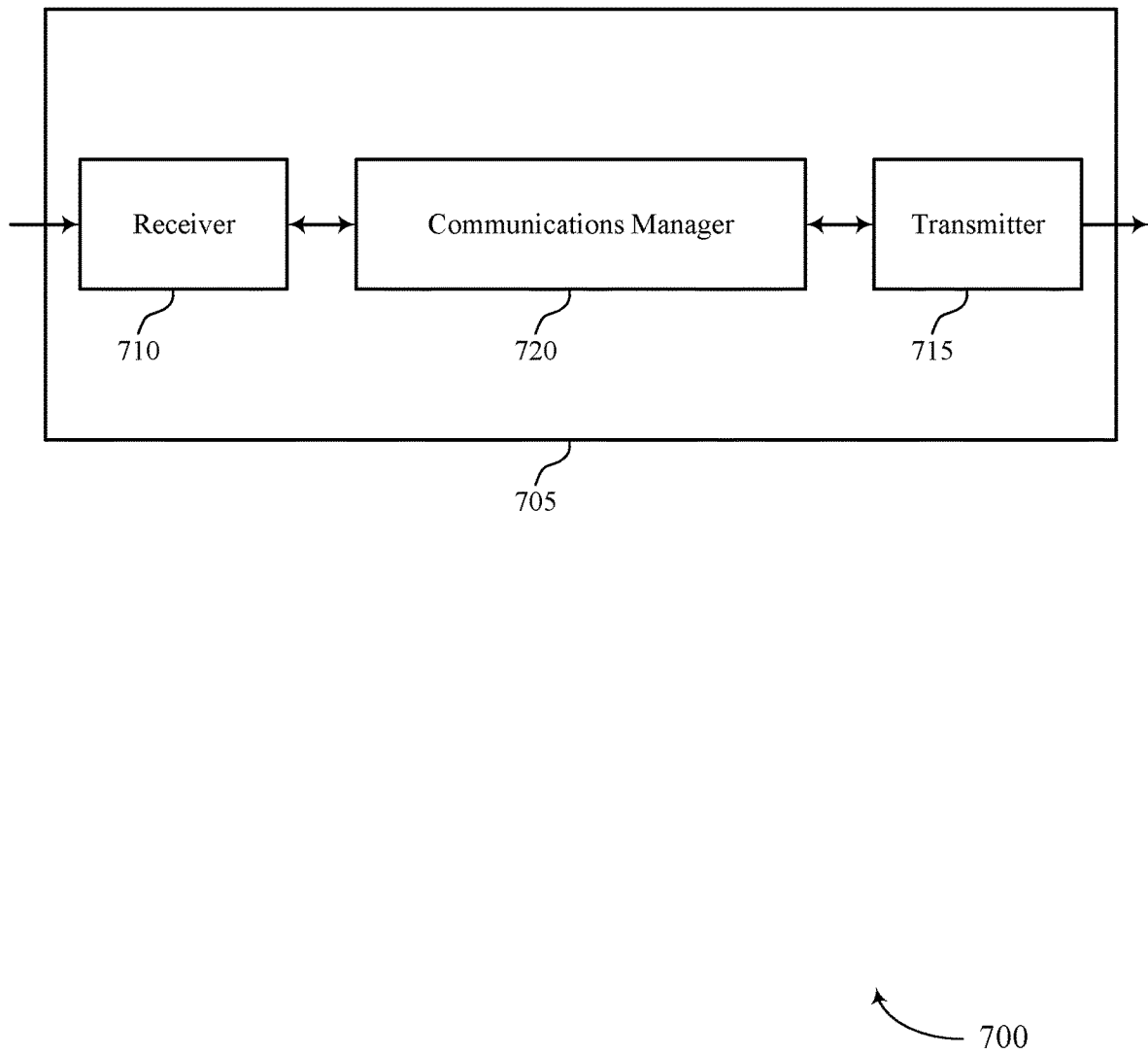
FIGS. 7 and 8 show block diagrams of devices that support uplink reference signal bundling techniques in wireless communications in accordance with aspects of the present disclosure.

FIG. 7 shows a block diagram 700 of a device 705 that supports uplink reference signal bundling techniques in wireless communications in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to uplink reference signal bundling techniques in wireless communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to uplink reference signal bundling techniques in wireless communications). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of uplink reference signal bundling techniques in wireless communications as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving configuration information for a first reference signal that is to maintain phase continuity across transmissions of at least a first instance of the first reference signal and a second instance of the first reference signal. The communications manager 720 may be configured as or otherwise support a means for identifying time domain resources for a first transmission from the UE that are between the first instance of the first reference signal and the second instance of the first reference signal, where the first transmission has one or more transmission parameters that disrupt the phase continuity across the first instance of the first reference signal and the second instance of the first reference signal. The communications manager 720 may be configured as or otherwise support a means for determining to transmit the first transmission or drop the first transmission based on both the identified time domain resources and a time duration between the first instance of the first reference signal and the second instance of the first reference signal.

Additionally or alternatively, the communications manager 720 may support wireless communication at a UE in accordance with examples as disclosed herein. For example, the communications manager 720 may be configured as or otherwise support a means for receiving configuration information for a first reference signal that is to maintain phase continuity across transmissions of at least a first instance of the first reference signal and a second instance of the first reference signal. The communications manager 720 may be configured as or otherwise support a means for identifying frequency domain resources for a first transmission from the UE that at least partially overlap in time with frequency domain resources of the second instance of the first reference signal, where the first transmission has one or more transmission parameters that, if unadjusted, disrupt the phase continuity across the first instance of the first reference signal and the second instance of the first reference signal. The communications manager 720 may be configured as or otherwise support a means for determining one or more transmission parameter adjustments of one or more of the first transmission or the second instance of the first reference signal based on the overlap in time of the frequency domain resources of the first transmission and the second instance of the first reference signal.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for uplink reference signal bundling for joint processing of multiple instances of a communication, and for transmitting or dropping one or more other transmissions that may disrupt phase continuity associated with the joint processing, which may enhance communications reliability and efficiency, power consumption, battery life, and throughput, among other benefits.

Figure 8:
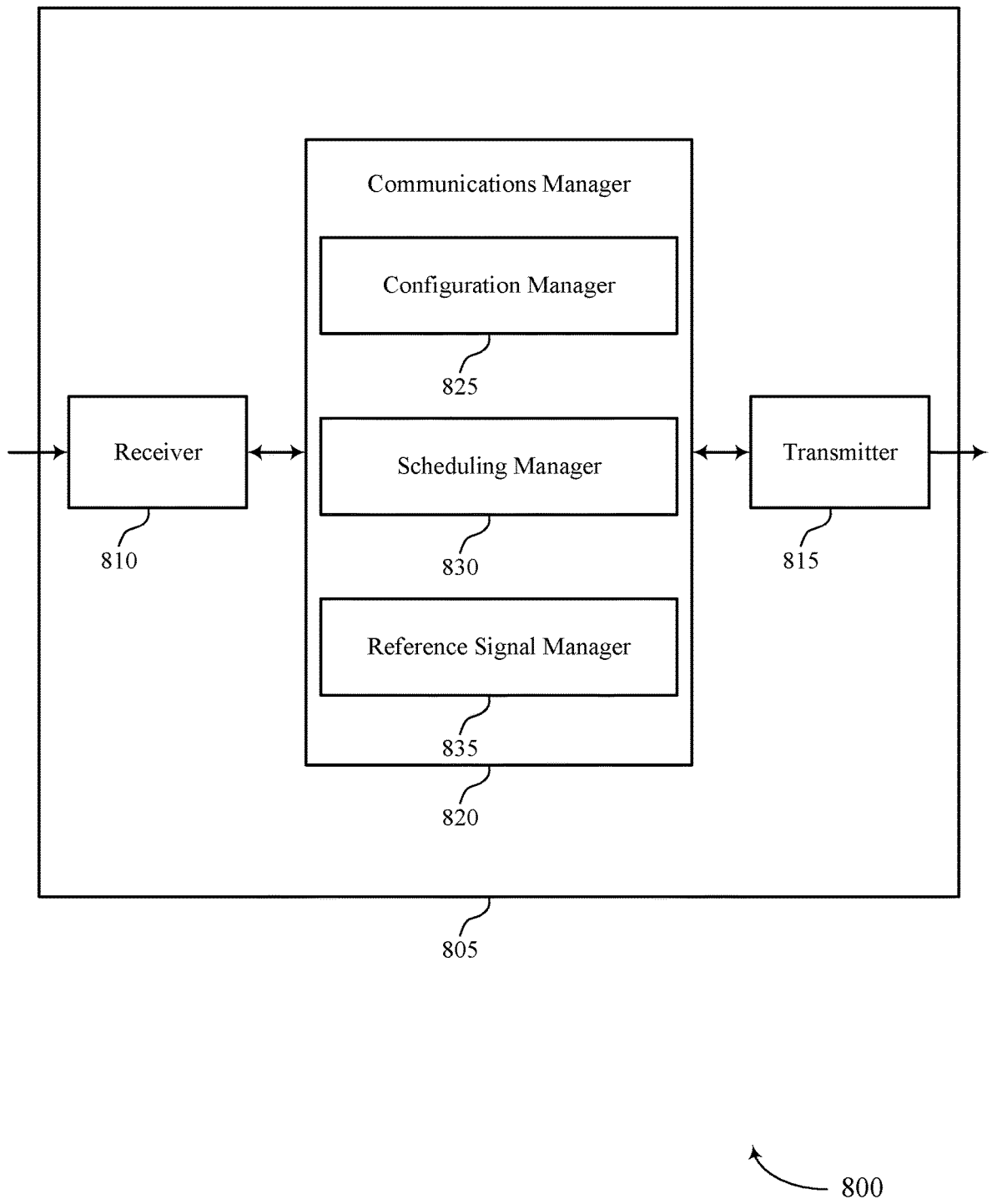

FIG. 8 shows a block diagram 800 of a device 805 that supports uplink reference signal bundling techniques in wireless communications in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to uplink reference signal bundling techniques in wireless communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to uplink reference signal bundling techniques in wireless communications). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of uplink reference signal bundling techniques in wireless communications as described herein. For example, the communications manager 820 may include a configuration manager 825, a scheduling manager 830, a reference signal manager 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The configuration manager 825 may be configured as or otherwise support a means for receiving configuration information for a first reference signal that is to maintain phase continuity across transmissions of at least a first instance of the first reference signal and a second instance of the first reference signal. The scheduling manager 830 may be configured as or otherwise support a means for identifying time domain resources for a first transmission from the UE that are between the first instance of the first reference signal and the second instance of the first reference signal, where the first transmission has one or more transmission parameters that disrupt the phase continuity across the first instance of the first reference signal and the second instance of the first reference signal. The reference signal manager 835 may be configured as or otherwise support a means for determining to transmit the first transmission or drop the first transmission based on a time duration between the first instance of the first reference signal and the second instance of the first reference signal.

Additionally or alternatively, the communications manager 820 may support wireless communication at a UE in accordance with examples as disclosed herein. The configuration manager 825 may be configured as or otherwise support a means for receiving configuration information for a first reference signal that is to maintain phase continuity across transmissions of at least a first instance of the first reference signal and a second instance of the first reference signal. The scheduling manager 830 may be configured as or otherwise support a means for identifying frequency domain resources for a first transmission from the UE that at least partially overlap in time with frequency domain resources of the second instance of the first reference signal, where the first transmission has one or more transmission parameters that, if unadjusted, disrupt the phase continuity across the first instance of the first reference signal and the second instance of the first reference signal. The reference signal manager 835 may be configured as or otherwise support a means for determining one or more transmission parameter adjustments of one or more of the first transmission or the second instance of the first reference signal based on the overlap in time of the frequency domain resources of the first transmission and the second instance of the first reference signal.

Figure 9:
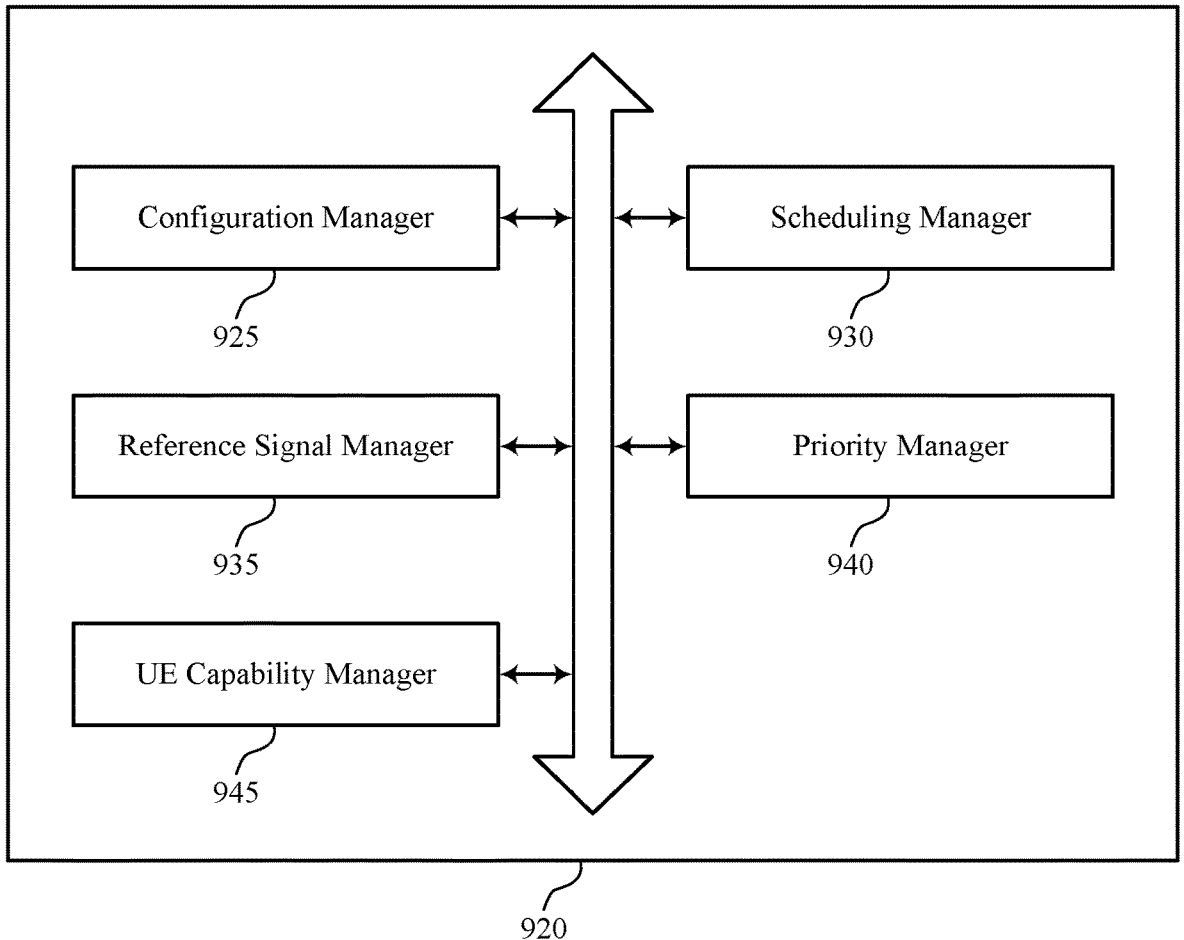
FIG. 9 shows a block diagram of a communications manager that supports uplink reference signal bundling techniques in wireless communications in accordance with aspects of the present disclosure.

FIG. 9 shows a block diagram 900 of a communications manager 920 that supports uplink reference signal bundling techniques in wireless communications in accordance with aspects of the present disclosure. The communications manager 920 may be an example of aspects of a communications manager 720, a communications manager 820, or both, as described herein. The communications manager 920, or various components thereof, may be an example of means for performing various aspects of uplink reference signal bundling techniques in wireless communications as described herein. For example, the communications manager 920 may include a configuration manager 925, a scheduling manager 930, a reference signal manager 935, a priority manager 940, a UE capability manager 945, or any combination thereof. Each of these components may communicate, directly or indirectly, with one another (e.g., via one or more buses).

The communications manager 920 may support wireless communication at a UE in accordance with examples as disclosed herein. The configuration manager 925 may be configured as or otherwise support a means for receiving configuration information for a first reference signal that is to maintain phase continuity across transmissions of at least a first instance of the first reference signal and a second instance of the first reference signal. The scheduling manager 930 may be configured as or otherwise support a means for identifying time domain resources for a first transmission from the UE that are between the first instance of the first reference signal and the second instance of the first reference signal, where the first transmission has one or more transmission parameters that disrupt the phase continuity across the first instance of the first reference signal and the second instance of the first reference signal. The reference signal manager 935 may be configured as or otherwise support a means for determining to transmit the first transmission or drop the first transmission based on a time duration between the first instance of the first reference signal and the second instance of the first reference signal.

In some examples, the first reference signal is a DMRS associated with one or more data transmissions from the UE. In some examples, the first transmission from the UE is a sidelink transmission from the UE to another UE, or is an uplink transmission from the UE to a base station that has one or more different transmission parameters than the first reference signal.

In some examples, to support determining, the reference signal manager 935 may be configured as or otherwise support a means for determining to transmit the first transmission based on the time duration between the first instance of the first reference signal and the second instance of the first reference signal exceeding a time threshold value. In some examples, the phase continuity across the first instance of the first reference signal and the second instance of the first reference signal is not assumed to be maintained when the time duration between the first instance of the first reference signal and the second instance of the first reference signal exceeds the time threshold value.

In some examples, to support determining, the reference signal manager 935 may be configured as or otherwise support a means for determining to drop the first transmission based on the time duration between the first instance of the first reference signal and the second instance of the first reference signal being less than or equal to a time threshold value. In some examples, the determining to transmit the first transmission or drop the first transmission is further based on a priority associated with the first transmission relative to a priority associated with the first reference signal.

In some examples, to support determining, the priority manager 940 may be configured as or otherwise support a means for determining to transmit the first transmission based on the priority associated with the first transmission, and where the phase continuity across the first instance of the first reference signal and the second instance of the first reference signal is not maintained.

In some examples, to support determining, the UE capability manager 945 may be configured as or otherwise support a means for determining to transmit the first transmission and maintain the phase continuity across the first instance of the first reference signal and the second instance of the first reference signal based on a capability of the UE. In some examples, the time duration corresponds to a determined number of OFDM symbols. In some examples, the determined number of OFDM symbols is based on a time period which the UE will maintain activation of a power amplifier.

Additionally or alternatively, the communications manager 920 may support wireless communication at a UE in accordance with examples as disclosed herein. In some examples, the configuration manager 925 may be configured as or otherwise support a means for receiving configuration information for a first reference signal that is to maintain phase continuity across transmissions of at least a first instance of the first reference signal and a second instance of the first reference signal. In some examples, the scheduling manager 930 may be configured as or otherwise support a means for identifying frequency domain resources for a first transmission from the UE that at least partially overlap in time with frequency domain resources of the second instance of the first reference signal, where the first transmission has one or more transmission parameters that, if unadjusted, disrupt the phase continuity across the first instance of the first reference signal and the second instance of the first reference signal. In some examples, the reference signal manager 935 may be configured as or otherwise support a means for determining one or more transmission parameter adjustments of one or more of the first transmission or the second instance of the first reference signal based on the overlap in time of the frequency domain resources of the first transmission and the second instance of the first reference signal. In some examples, the first transmission from the UE is a sidelink transmission from the UE to another UE, or is an uplink transmission from the UE to a base station.

In some examples, to support determining, the reference signal manager 935 may be configured as or otherwise support a means for determining a first reference signal power for transmission of both the first instance of the first reference signal and the second instance of the first reference signal, and where the first transmission uses a remaining amount of power available after the first reference signal power is used to transmit the second instance of the first reference signal. In some examples, the determining includes determining to drop the first transmission in order maintain the phase continuity across the first instance of the first reference signal and the second instance of the first reference signal. In some examples, the determining to drop the first transmission is based on a time duration between the first instance of the first reference signal and the second instance of the first reference signal being less than or equal to a time threshold value.

In some examples, to support determining, the priority manager 940 may be configured as or otherwise support a means for determining to transmit the first transmission based on a priority associated with the first transmission, and where the phase continuity across the first instance of the first reference signal and the second instance of the first reference signal is not maintained. In some examples, the priority manager 940 may be configured as or otherwise support a means for transmitting an indication to a receiving device that the phase continuity across the first instance of the first reference signal and the second instance of the first reference signal is not maintained.

In some examples, to support determining the one or more transmission parameter adjustments, the scheduling manager 930 may be configured as or otherwise support a means for determining that an uplink transmission associated with the second instance of the first reference signal is a repetition of a prior uplink transmission. In some examples, to support determining the one or more transmission parameter adjustments, the scheduling manager 930 may be configured as or otherwise support a means for determining to drop the uplink transmission associated with the second instance of the first reference signal, and transmit the first transmission at using a transmission power that is determined based on the dropped uplink transmission.

In some examples, to support determining the one or more transmission parameter adjustments, the priority manager 940 may be configured as or otherwise support a means for determining that the first transmission has a higher priority than the uplink transmission associated with the second instance of the first reference signal.

Figure 10:
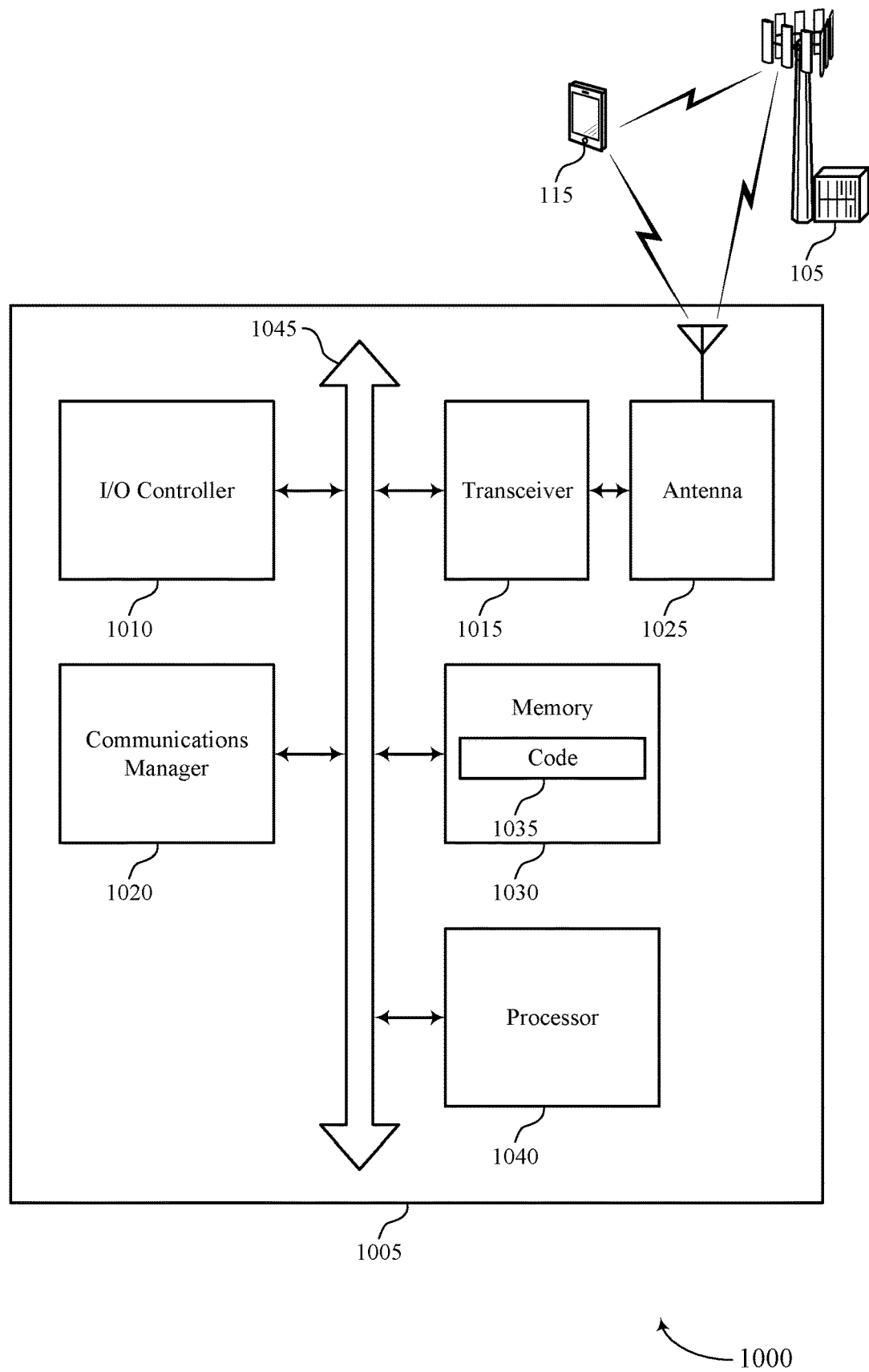
FIG. 10 shows a diagram of a system including a device that supports uplink reference signal bundling techniques in wireless communications in accordance with aspects of the present disclosure.

FIG. 10 shows a diagram of a system 1000 including a device 1005 that supports uplink reference signal bundling techniques in wireless communications in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting uplink reference signal bundling techniques in wireless communications). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving configuration information for a first reference signal that is to maintain phase continuity across transmissions of at least a first instance of the first reference signal and a second instance of the first reference signal. The communications manager 1020 may be configured as or otherwise support a means for identifying time domain resources for a first transmission from the UE that are between the first instance of the first reference signal and the second instance of the first reference signal, where the first transmission has one or more transmission parameters that disrupt the phase continuity across the first instance of the first reference signal and the second instance of the first reference signal. The communications manager 1020 may be configured as or otherwise support a means for determining to transmit the first transmission or drop the first transmission based on a time duration between the first instance of the first reference signal and the second instance of the first reference signal.

Additionally or alternatively, the communications manager 1020 may support wireless communication at a UE in accordance with examples as disclosed herein. For example, the communications manager 1020 may be configured as or otherwise support a means for receiving configuration information for a first reference signal that is to maintain phase continuity across transmissions of at least a first instance of the first reference signal and a second instance of the first reference signal. The communications manager 1020 may be configured as or otherwise support a means for identifying frequency domain resources for a first transmission from the UE that at least partially overlap in time with frequency domain resources of the second instance of the first reference signal, where the first transmission has one or more transmission parameters that, if unadjusted, disrupt the phase continuity across the first instance of the first reference signal and the second instance of the first reference signal. The communications manager 1020 may be configured as or otherwise support a means for determining one or more transmission parameter adjustments of one or more of the first transmission or the second instance of the first reference signal based on the overlap in time of the frequency domain resources of the first transmission and the second instance of the first reference signal.

By including or configuring the communications manager 1020 in accordance with examples as described herein, the device 1005 may support techniques for uplink reference signal bundling for joint processing of multiple instances of a communication, and for transmitting or dropping one or more other transmissions that may disrupt phase continuity associated with the joint processing, which may enhance communications reliability and efficiency, power consumption, battery life, and throughput, among other benefits.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of uplink reference signal bundling techniques in wireless communications as described herein, or the processor 1040 and the memory 1030 may be otherwise configured to perform or support such operations.

Figure 11:
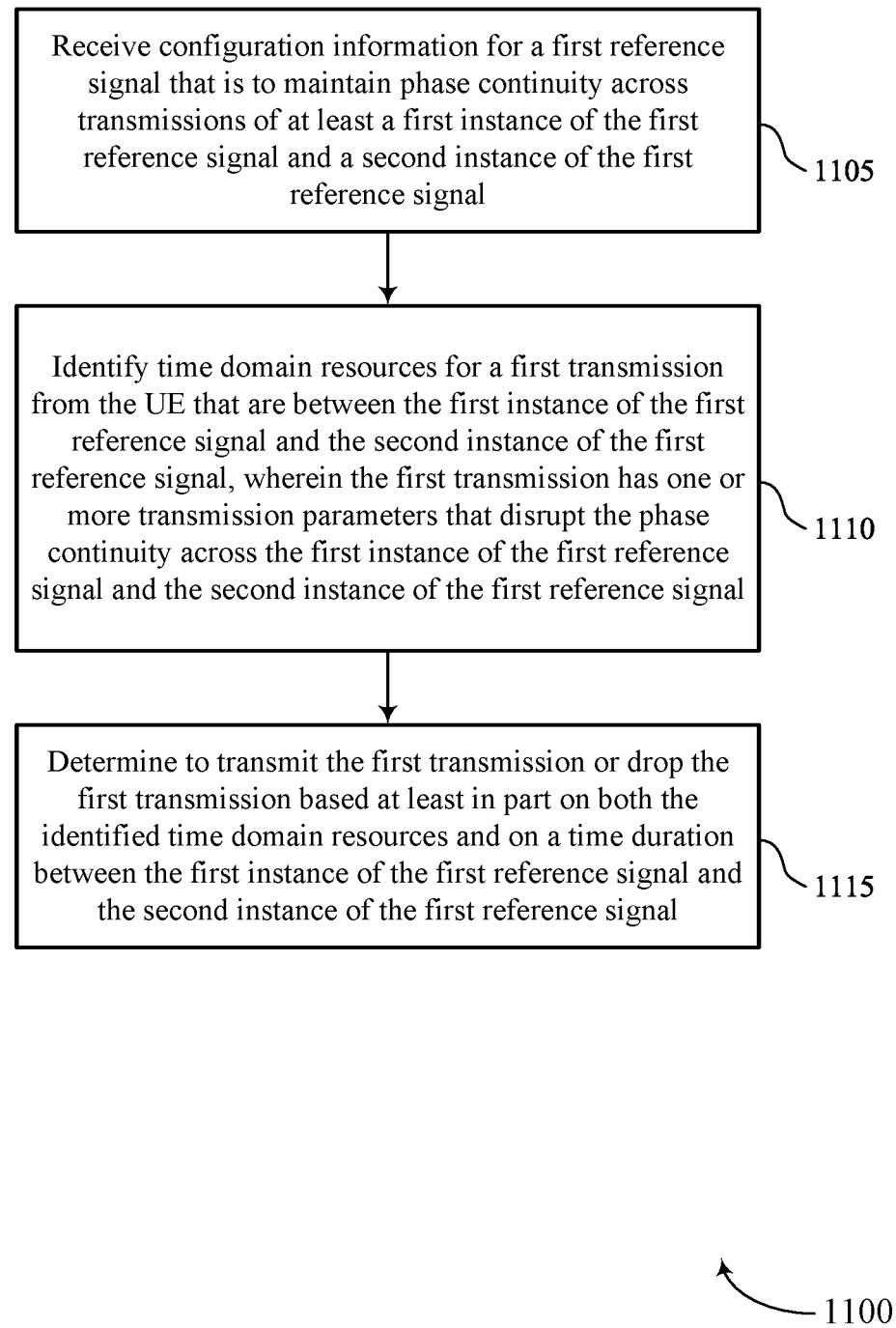
FIGS. 11 through 20 show flowcharts illustrating methods that support uplink reference signal bundling techniques in wireless communications in accordance with aspects of the present disclosure.

FIG. 11 shows a flowchart illustrating a method 1100 that supports uplink reference signal bundling techniques in wireless communications in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1105, the method may include receiving configuration information for a first reference signal that is to maintain phase continuity across transmissions of at least a first instance of the first reference signal and a second instance of the first reference signal. The operations of 1105 may be performed in accordance with examples as disclosed herein. In some examples, aspects of the operations of 1105 may be performed by a configuration manager 925 as described with reference to FIG. 9.

At 1110, the method may include identifying time domain resources for a first transmission from the UE that are between the first instance of the first reference signal and the second instance of the first reference signal, where the first transmission has one or more transmission parameters that disrupt the phase continuity across the first instance of the first reference signal and the second instance of the first reference signal. The operations of 1110 may be performed in accordance with examples as disclosed herein. In some examples, aspects of the operations of 1110 may be performed by a scheduling manager 930 as described with reference to FIG. 9.

At 1115, the method may include determining to transmit the first transmission or drop the first transmission based on both the identified time domain resources and on a time duration between the first instance of the first reference signal and the second instance of the first reference signal. The operations of 1115 may be performed in accordance with examples as disclosed herein. In some examples, aspects of the operations of 1115 may be performed by a reference signal manager 935 as described with reference to FIG. 9.

Figure 12:
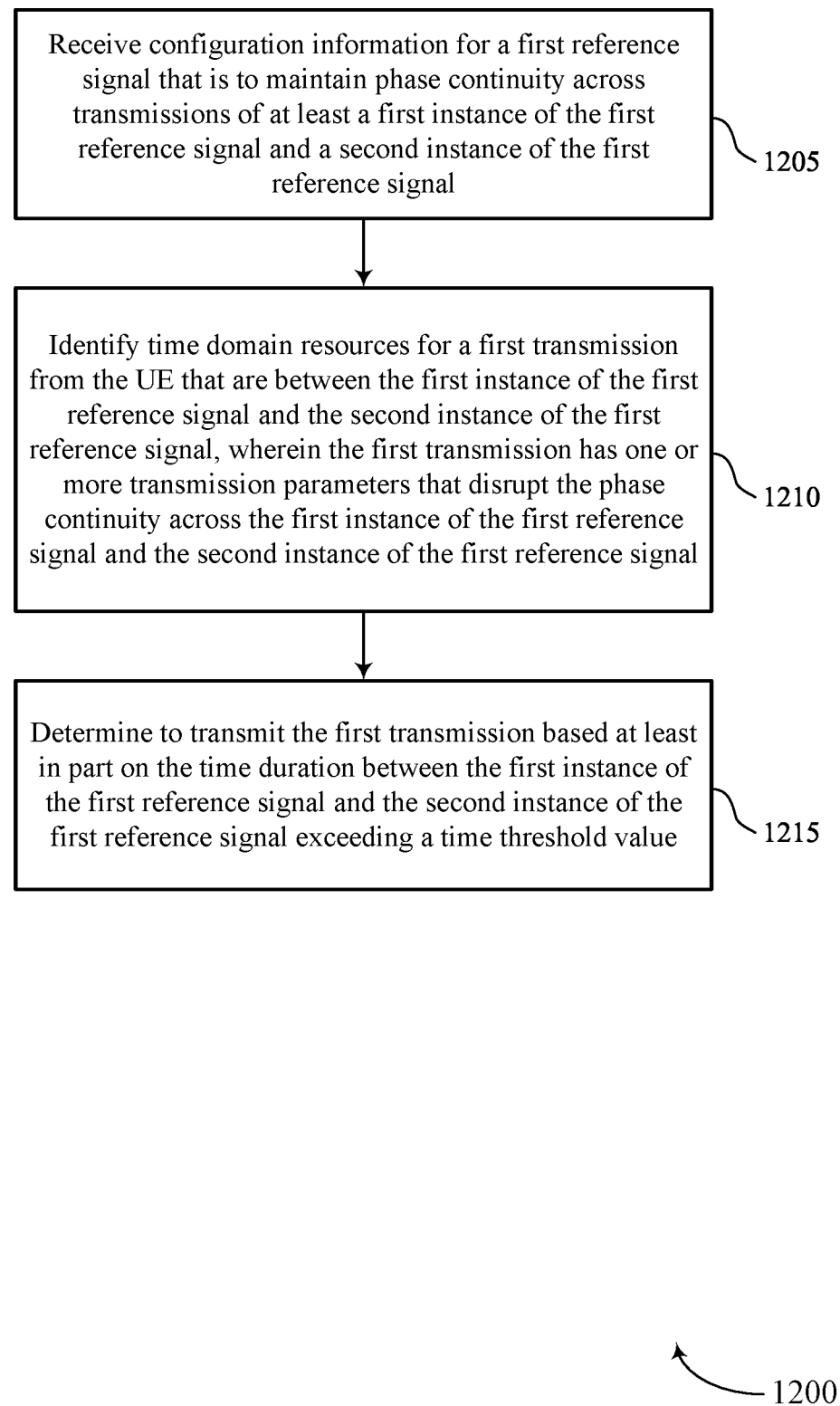

FIG. 12 shows a flowchart illustrating a method 1200 that supports uplink reference signal bundling techniques in wireless communications in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include receiving configuration information for a first reference signal that is to maintain phase continuity across transmissions of at least a first instance of the first reference signal and a second instance of the first reference signal. The operations of 1205 may be performed in accordance with examples as disclosed herein. In some examples, aspects of the operations of 1205 may be performed by a configuration manager 925 as described with reference to FIG. 9.

At 1210, the method may include identifying time domain resources for a first transmission from the UE that are between the first instance of the first reference signal and the second instance of the first reference signal, where the first transmission has one or more transmission parameters that disrupt the phase continuity across the first instance of the first reference signal and the second instance of the first reference signal. The operations of 1210 may be performed in accordance with examples as disclosed herein. In some examples, aspects of the operations of 1210 may be performed by a scheduling manager 930 as described with reference to FIG. 9.

At 1215, the method may include determining to transmit the first transmission based on the time duration between the first instance of the first reference signal and the second instance of the first reference signal exceeding a time threshold value. The operations of 1215 may be performed in accordance with examples as disclosed herein. In some examples, aspects of the operations of 1215 may be performed by a reference signal manager 935 as described with reference to FIG. 9. In some cases, the phase continuity across the first instance of the first reference signal and the second instance of the first reference signal being not assumed to be maintained when the time duration between the first instance of the first reference signal and the second instance of the first reference signal exceeds the time threshold value.

Figure 13:
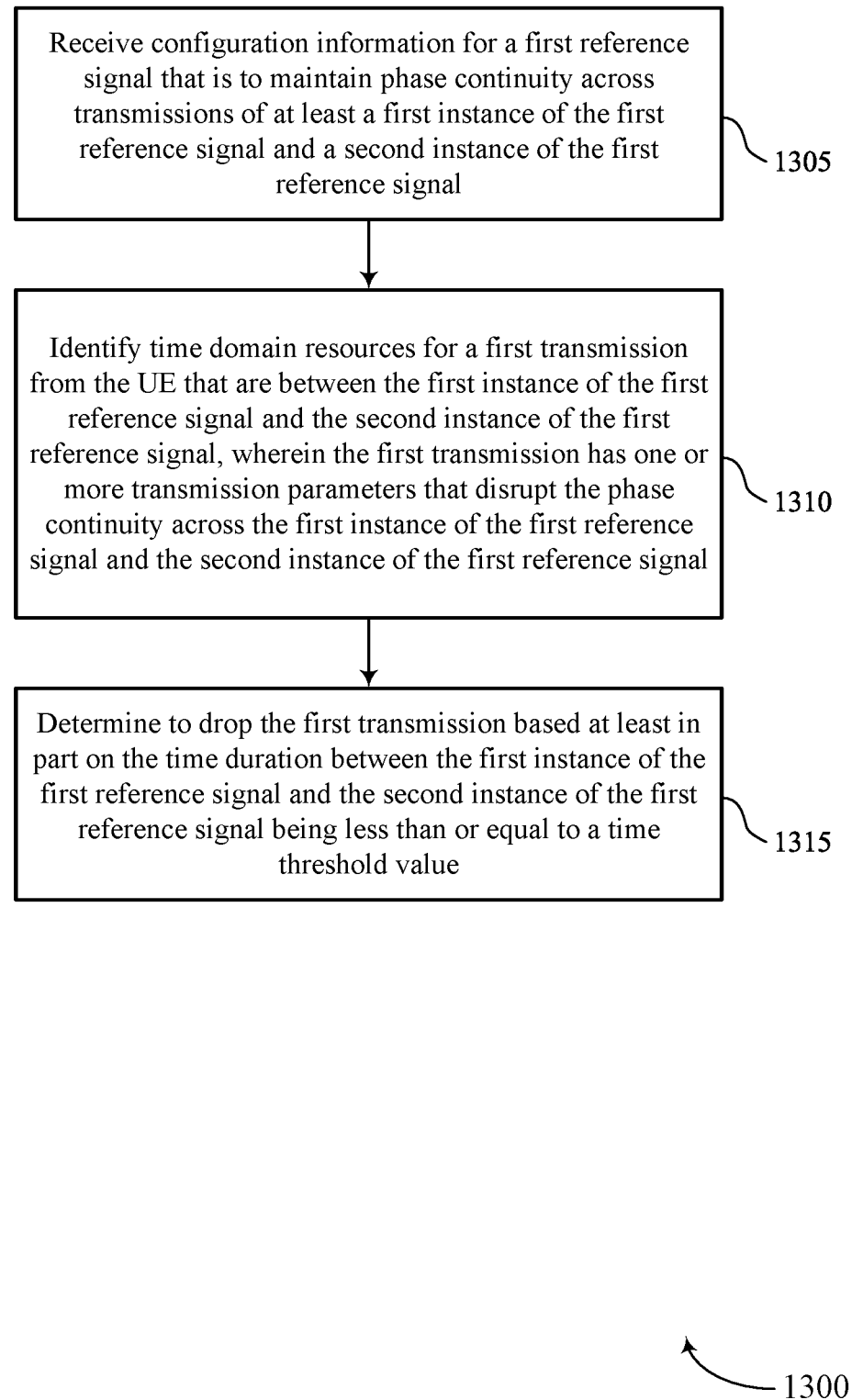

FIG. 13 shows a flowchart illustrating a method 1300 that supports uplink reference signal bundling techniques in wireless communications in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include receiving configuration information for a first reference signal that is to maintain phase continuity across transmissions of at least a first instance of the first reference signal and a second instance of the first reference signal. The operations of 1305 may be performed in accordance with examples as disclosed herein. In some examples, aspects of the operations of 1305 may be performed by a configuration manager 925 as described with reference to FIG. 9.

At 1310, the method may include identifying time domain resources for a first transmission from the UE that are between the first instance of the first reference signal and the second instance of the first reference signal, where the first transmission has one or more transmission parameters that disrupt the phase continuity across the first instance of the first reference signal and the second instance of the first reference signal. The operations of 1310 may be performed in accordance with examples as disclosed herein. In some examples, aspects of the operations of 1310 may be performed by a scheduling manager 930 as described with reference to FIG. 9.

At 1315, the method may include determining to drop the first transmission based on the time duration between the first instance of the first reference signal and the second instance of the first reference signal being less than or equal to a time threshold value. The operations of 1315 may be performed in accordance with examples as disclosed herein. In some examples, aspects of the operations of 1315 may be performed by a reference signal manager 935 as described with reference to FIG. 9.

Figure 14:
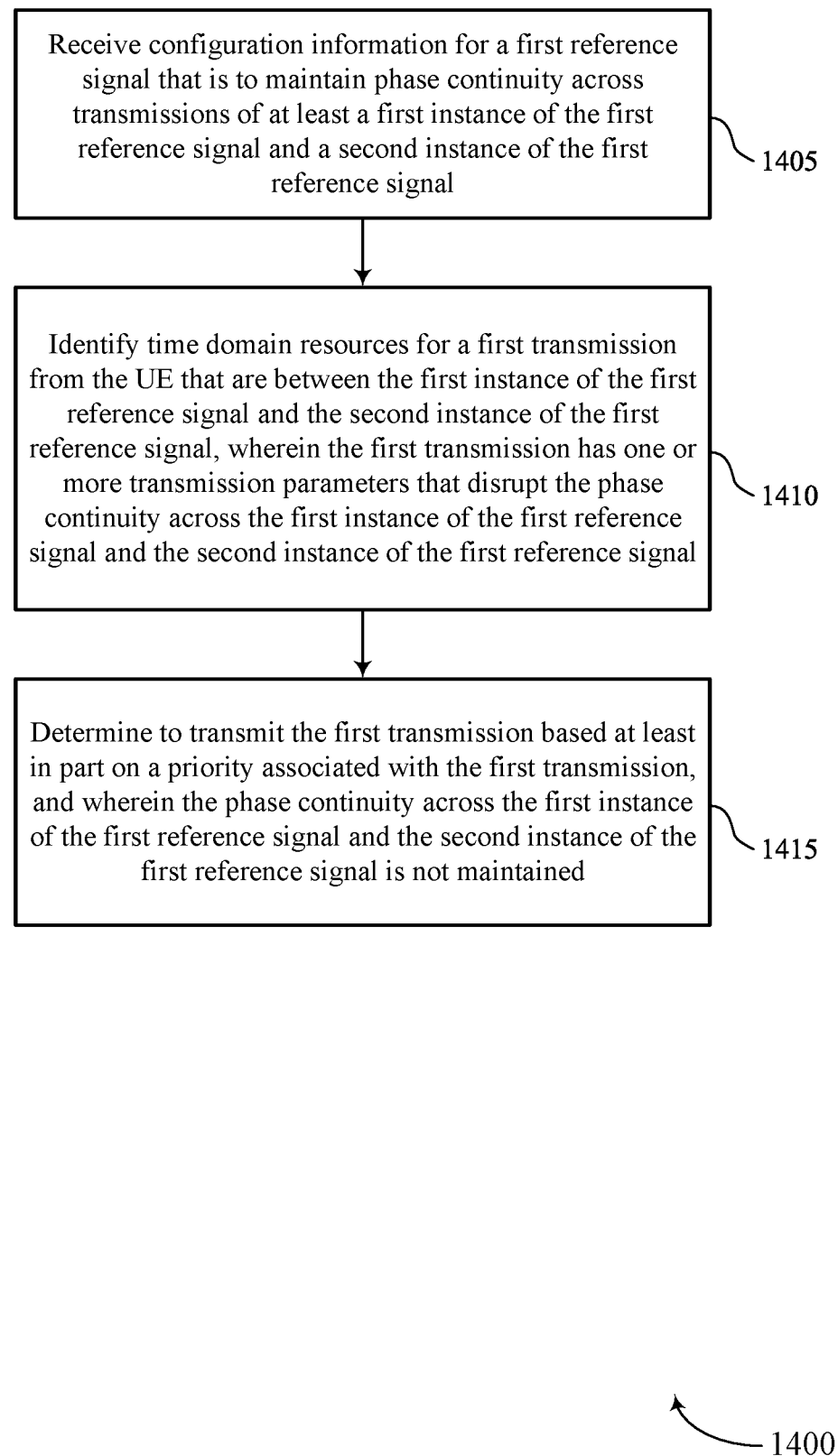

FIG. 14 shows a flowchart illustrating a method 1400 that supports uplink reference signal bundling techniques in wireless communications in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1405, the method may include receiving configuration information for a first reference signal that is to maintain phase continuity across transmissions of at least a first instance of the first reference signal and a second instance of the first reference signal. The operations of 1405 may be performed in accordance with examples as disclosed herein. In some examples, aspects of the operations of 1405 may be performed by a configuration manager 925 as described with reference to FIG. 9.

At 1410, the method may include identifying time domain resources for a first transmission from the UE that are between the first instance of the first reference signal and the second instance of the first reference signal, where the first transmission has one or more transmission parameters that disrupt the phase continuity across the first instance of the first reference signal and the second instance of the first reference signal. The operations of 1410 may be performed in accordance with examples as disclosed herein. In some examples, aspects of the operations of 1410 may be performed by a scheduling manager 930 as described with reference to FIG. 9.

At 1415, the method may include determining to transmit the first transmission based on a priority associated with the first transmission, and where the phase continuity across the first instance of the first reference signal and the second instance of the first reference signal is not maintained. The operations of 1415 may be performed in accordance with examples as disclosed herein. In some examples, aspects of the operations of 1415 may be performed by a priority manager 940 as described with reference to FIG. 9. In some cases, the priority is a priority associated with the first transmission relative to a priority associated with the first reference signal.

Figure 15:
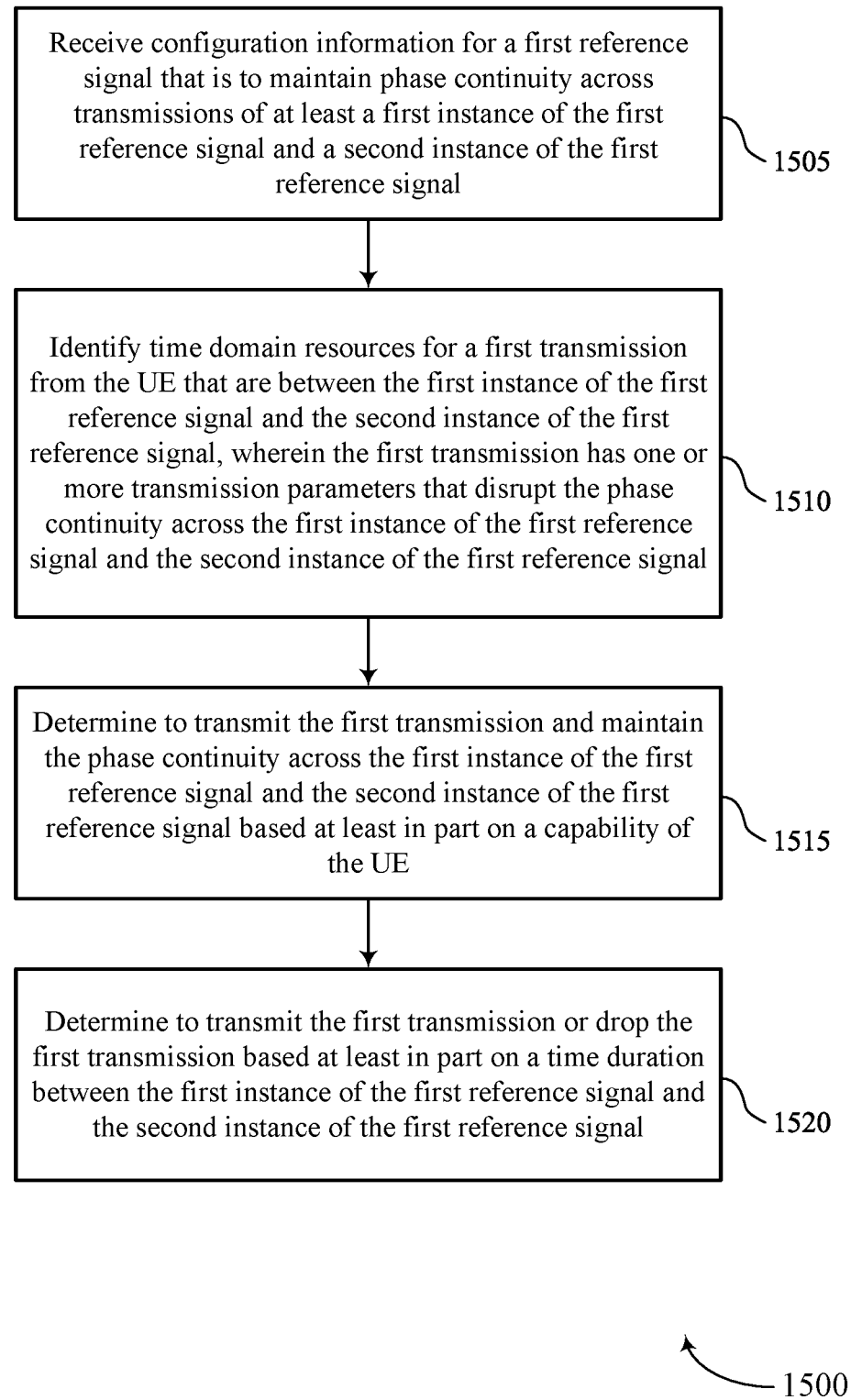

FIG. 15 shows a flowchart illustrating a method 1500 that supports uplink reference signal bundling techniques in wireless communications in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving configuration information for a first reference signal that is to maintain phase continuity across transmissions of at least a first instance of the first reference signal and a second instance of the first reference signal. The operations of 1505 may be performed in accordance with examples as disclosed herein. In some examples, aspects of the operations of 1505 may be performed by a configuration manager 925 as described with reference to FIG. 9.

At 1510, the method may include identifying time domain resources for a first transmission from the UE that are between the first instance of the first reference signal and the second instance of the first reference signal, where the first transmission has one or more transmission parameters that disrupt the phase continuity across the first instance of the first reference signal and the second instance of the first reference signal. The operations of 1510 may be performed in accordance with examples as disclosed herein. In some examples, aspects of the operations of 1510 may be performed by a scheduling manager 930 as described with reference to FIG. 9.

At 1515, the method may include determining to transmit the first transmission and maintain the phase continuity across the first instance of the first reference signal and the second instance of the first reference signal based on a capability of the UE. The operations of 1515 may be performed in accordance with examples as disclosed herein. In some examples, aspects of the operations of 1515 may be performed by a UE capability manager 945 as described with reference to FIG. 9.

Figure 16:
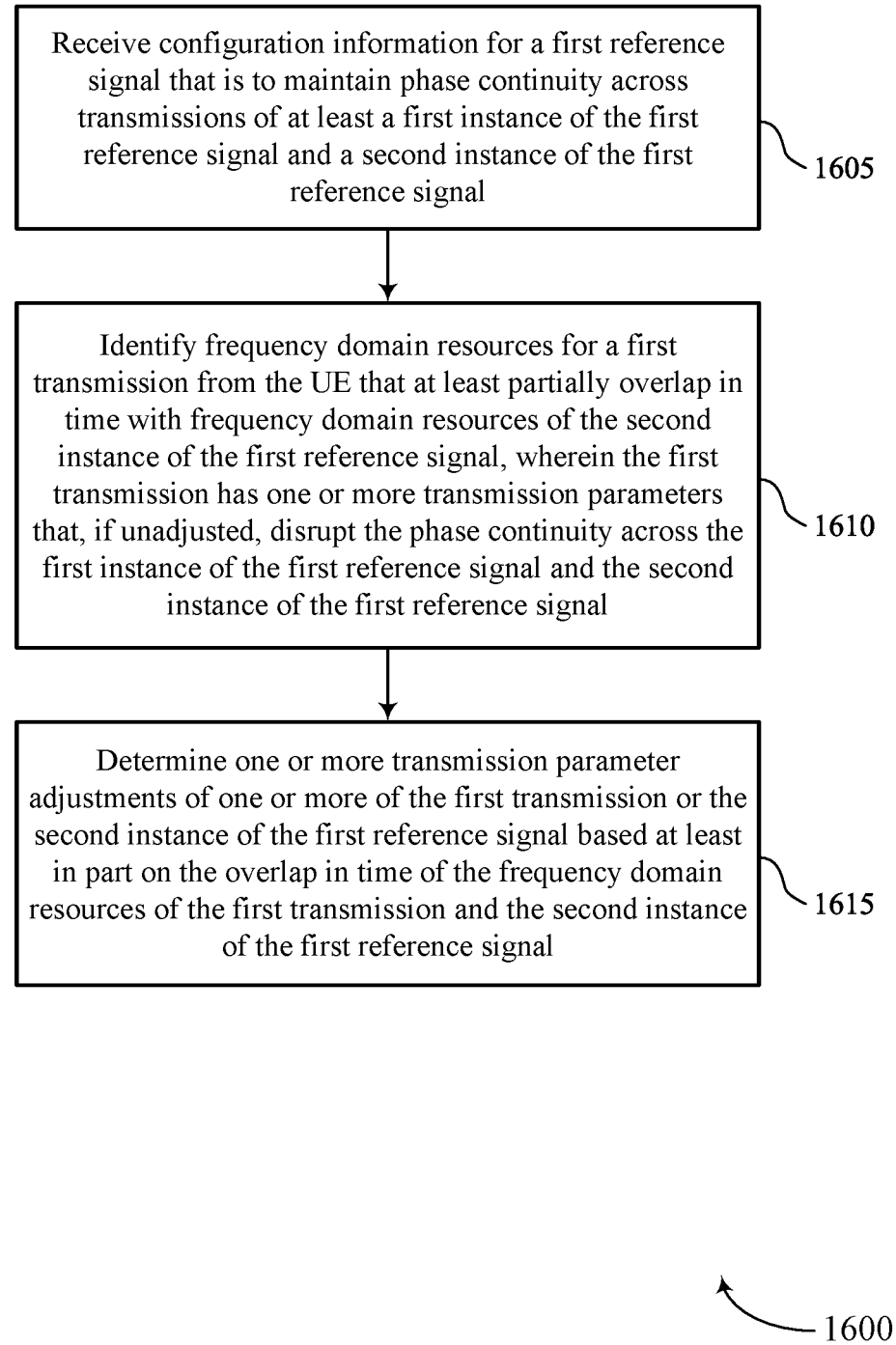

FIG. 16 shows a flowchart illustrating a method 1600 that supports uplink reference signal bundling techniques in wireless communications in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving configuration information for a first reference signal that is to maintain phase continuity across transmissions of at least a first instance of the first reference signal and a second instance of the first reference signal. The operations of 1605 may be performed in accordance with examples as disclosed herein. In some examples, aspects of the operations of 1605 may be performed by a configuration manager 925 as described with reference to FIG. 9.

At 1610, the method may include identifying frequency domain resources for a first transmission from the UE that at least partially overlap in time with frequency domain resources of the second instance of the first reference signal, where the first transmission has one or more transmission parameters that, if unadjusted, disrupt the phase continuity across the first instance of the first reference signal and the second instance of the first reference signal. The operations of 1610 may be performed in accordance with examples as disclosed herein. In some examples, aspects of the operations of 1610 may be performed by a scheduling manager 930 as described with reference to FIG. 9.

At 1615, the method may include determining one or more transmission parameter adjustments of one or more of the first transmission or the second instance of the first reference signal based on the overlap in time of the frequency domain resources of the first transmission and the second instance of the first reference signal. The operations of 1615 may be performed in accordance with examples as disclosed herein. In some examples, aspects of the operations of 1615 may be performed by a reference signal manager 935 as described with reference to FIG. 9.

Figure 17:
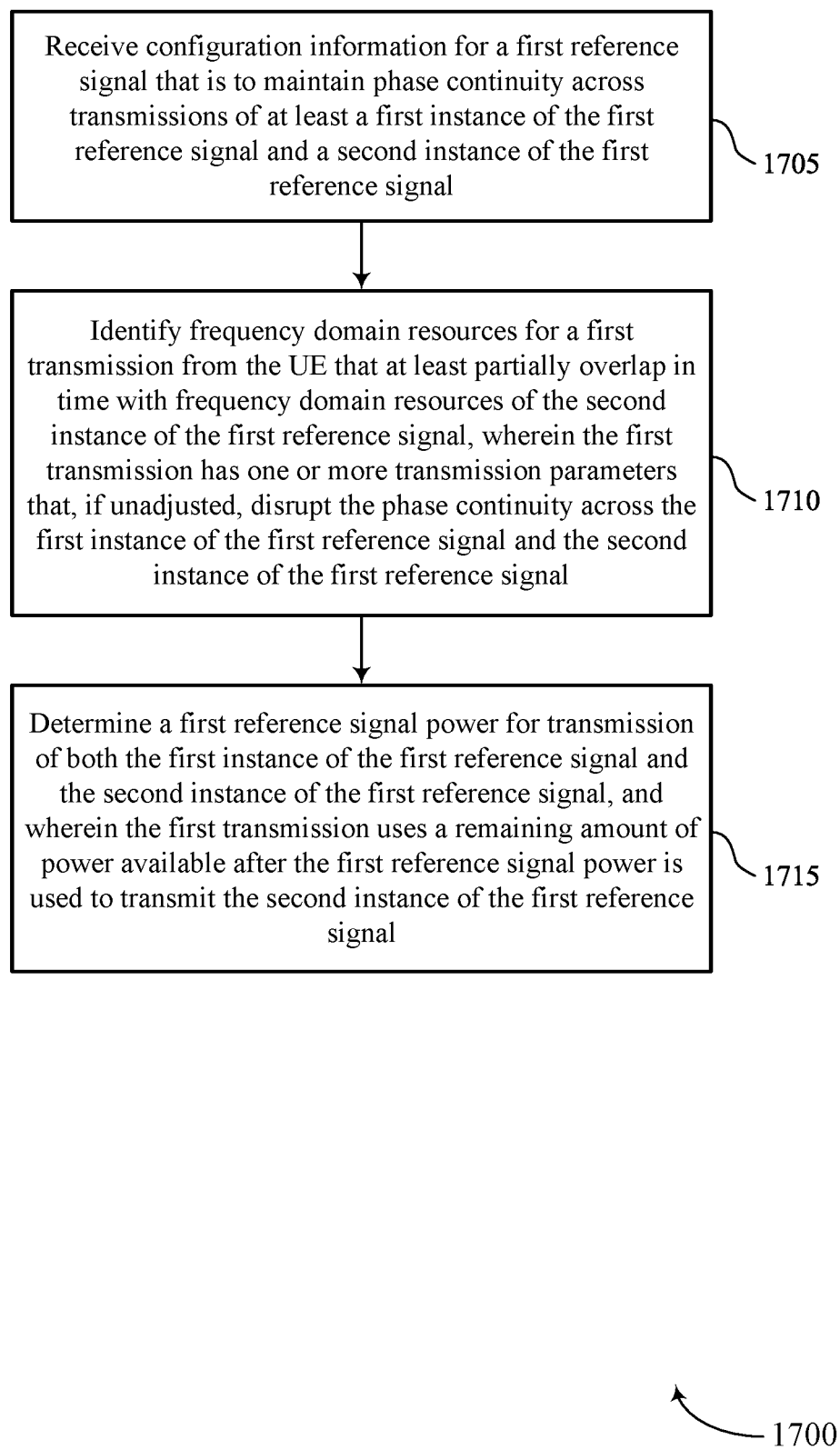

FIG. 17 shows a flowchart illustrating a method 1700 that supports uplink reference signal bundling techniques in wireless communications in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving configuration information for a first reference signal that is to maintain phase continuity across transmissions of at least a first instance of the first reference signal and a second instance of the first reference signal. The operations of 1705 may be performed in accordance with examples as disclosed herein. In some examples, aspects of the operations of 1705 may be performed by a configuration manager 925 as described with reference to FIG. 9.

At 1710, the method may include identifying frequency domain resources for a first transmission from the UE that at least partially overlap in time with frequency domain resources of the second instance of the first reference signal, where the first transmission has one or more transmission parameters that, if unadjusted, disrupt the phase continuity across the first instance of the first reference signal and the second instance of the first reference signal. The operations of 1710 may be performed in accordance with examples as disclosed herein. In some examples, aspects of the operations of 1710 may be performed by a scheduling manager 930 as described with reference to FIG. 9.

At 1715, the method may include determining a first reference signal power for transmission of both the first instance of the first reference signal and the second instance of the first reference signal, and where the first transmission uses a remaining amount of power available after the first reference signal power is used to transmit the second instance of the first reference signal. The operations of 1715 may be performed in accordance with examples as disclosed herein. In some examples, aspects of the operations of 1715 may be performed by a reference signal manager 935 as described with reference to FIG. 9.

Figure 18:
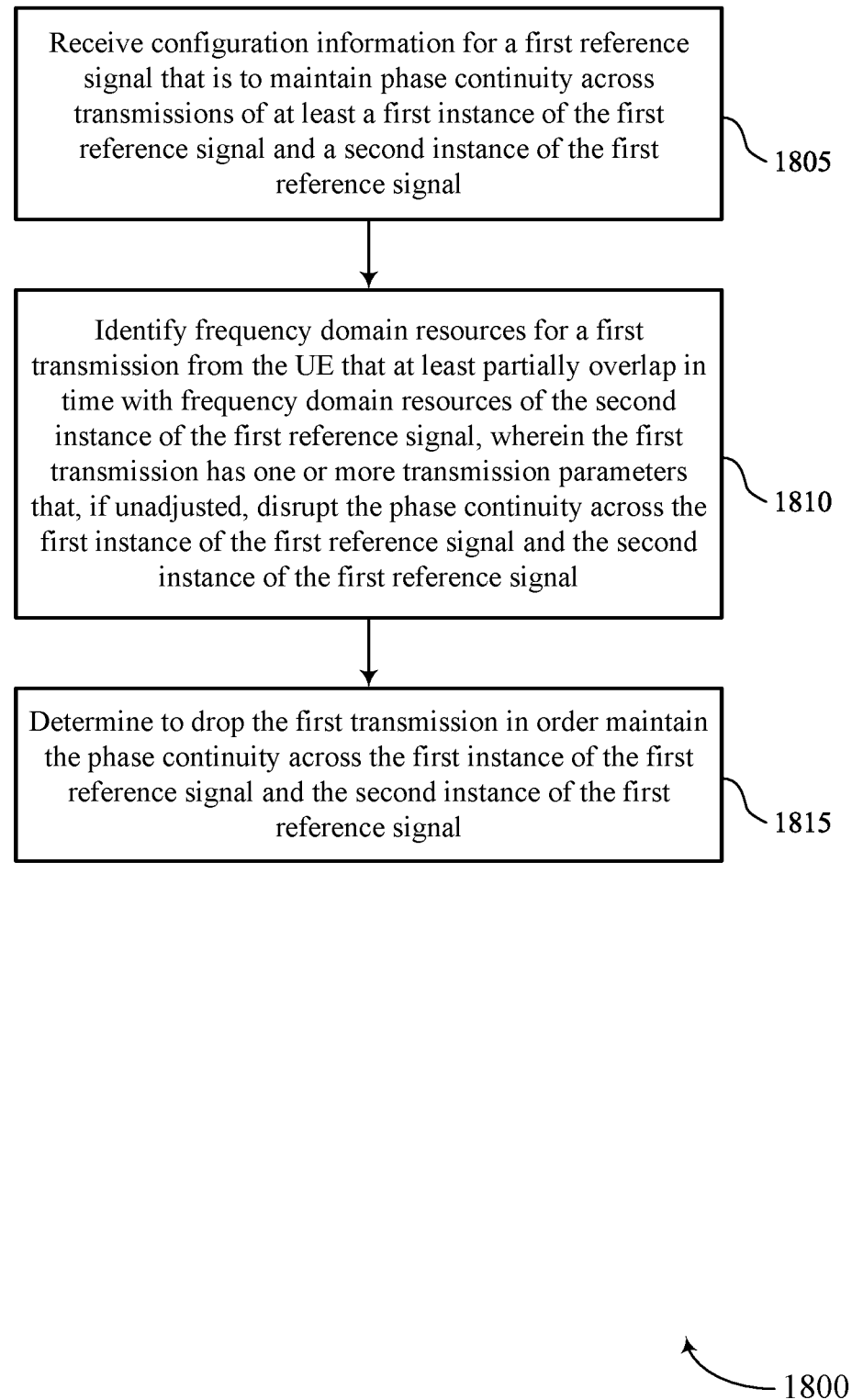

FIG. 18 shows a flowchart illustrating a method 1800 that supports uplink reference signal bundling techniques in wireless communications in accordance with aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1805, the method may include receiving configuration information for a first reference signal that is to maintain phase continuity across transmissions of at least a first instance of the first reference signal and a second instance of the first reference signal. The operations of 1805 may be performed in accordance with examples as disclosed herein.

In some examples, aspects of the operations of 1805 may be performed by a configuration manager 925 as described with reference to FIG. 9.

At 1810, the method may include identifying frequency domain resources for a first transmission from the UE that at least partially overlap in time with frequency domain resources of the second instance of the first reference signal, where the first transmission has one or more transmission parameters that, if unadjusted, disrupt the phase continuity across the first instance of the first reference signal and the second instance of the first reference signal. The operations of 1810 may be performed in accordance with examples as disclosed herein. In some examples, aspects of the operations of 1810 may be performed by a scheduling manager 930 as described with reference to FIG. 9.

At 1815, the method may include determining to drop the first transmission in order maintain the phase continuity across the first instance of the first reference signal and the second instance of the first reference signal. The operations of 1815 may be performed in accordance with examples as disclosed herein. In some examples, aspects of the operations of 1815 may be performed by a scheduling manager 930 as described with reference to FIG. 9.

Figure 19:
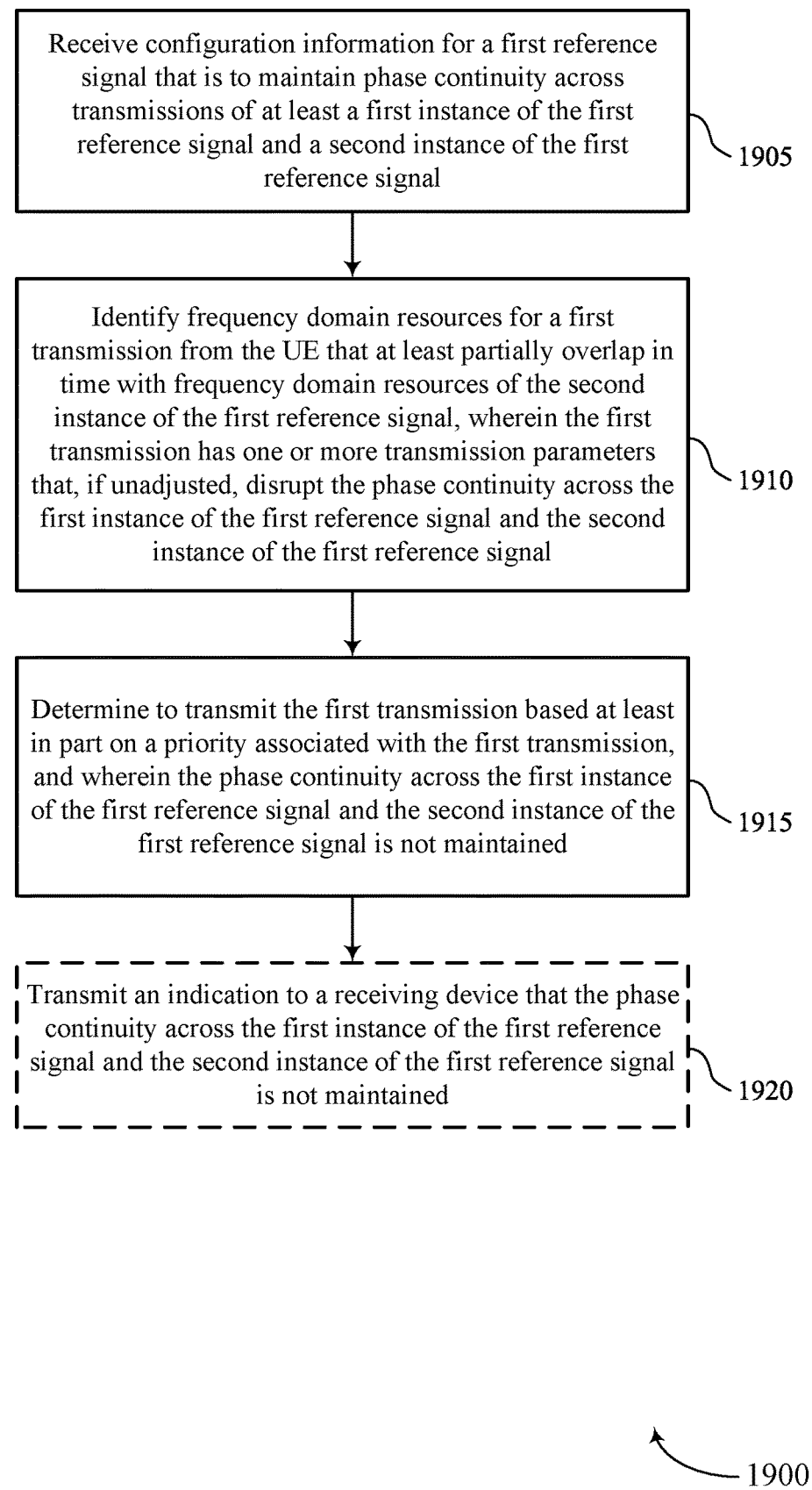

FIG. 19 shows a flowchart illustrating a method 1900 that supports uplink reference signal bundling techniques in wireless communications in accordance with aspects of the present disclosure. The operations of the method 1900 may be implemented by a UE or its components as described herein. For example, the operations of the method 1900 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1905, the method may include receiving configuration information for a first reference signal that is to maintain phase continuity across transmissions of at least a first instance of the first reference signal and a second instance of the first reference signal. The operations of 1905 may be performed in accordance with examples as disclosed herein. In some examples, aspects of the operations of 1905 may be performed by a configuration manager 925 as described with reference to FIG. 9.

At 1910, the method may include identifying frequency domain resources for a first transmission from the UE that at least partially overlap in time with frequency domain resources of the second instance of the first reference signal, where the first transmission has one or more transmission parameters that, if unadjusted, disrupt the phase continuity across the first instance of the first reference signal and the second instance of the first reference signal. The operations of 1910 may be performed in accordance with examples as disclosed herein. In some examples, aspects of the operations of 1910 may be performed by a scheduling manager 930 as described with reference to FIG. 9.

At 1915, the method may include determining to transmit the first transmission based on a priority associated with the first transmission, and where the phase continuity across the first instance of the first reference signal and the second instance of the first reference signal is not maintained. The operations of 1915 may be performed in accordance with examples as disclosed herein. In some examples, aspects of the operations of 1915 may be performed by a priority manager 940 as described with reference to FIG. 9.

In some cases, at 1920, the method may include transmitting an indication to a receiving device that the phase continuity across the first instance of the first reference signal and the second instance of the first reference signal is not maintained. The operations of 1920 may be performed in accordance with examples as disclosed herein. In some examples, aspects of the operations of 1920 may be performed by a priority manager 940 as described with reference to FIG. 9.

Figure 20:
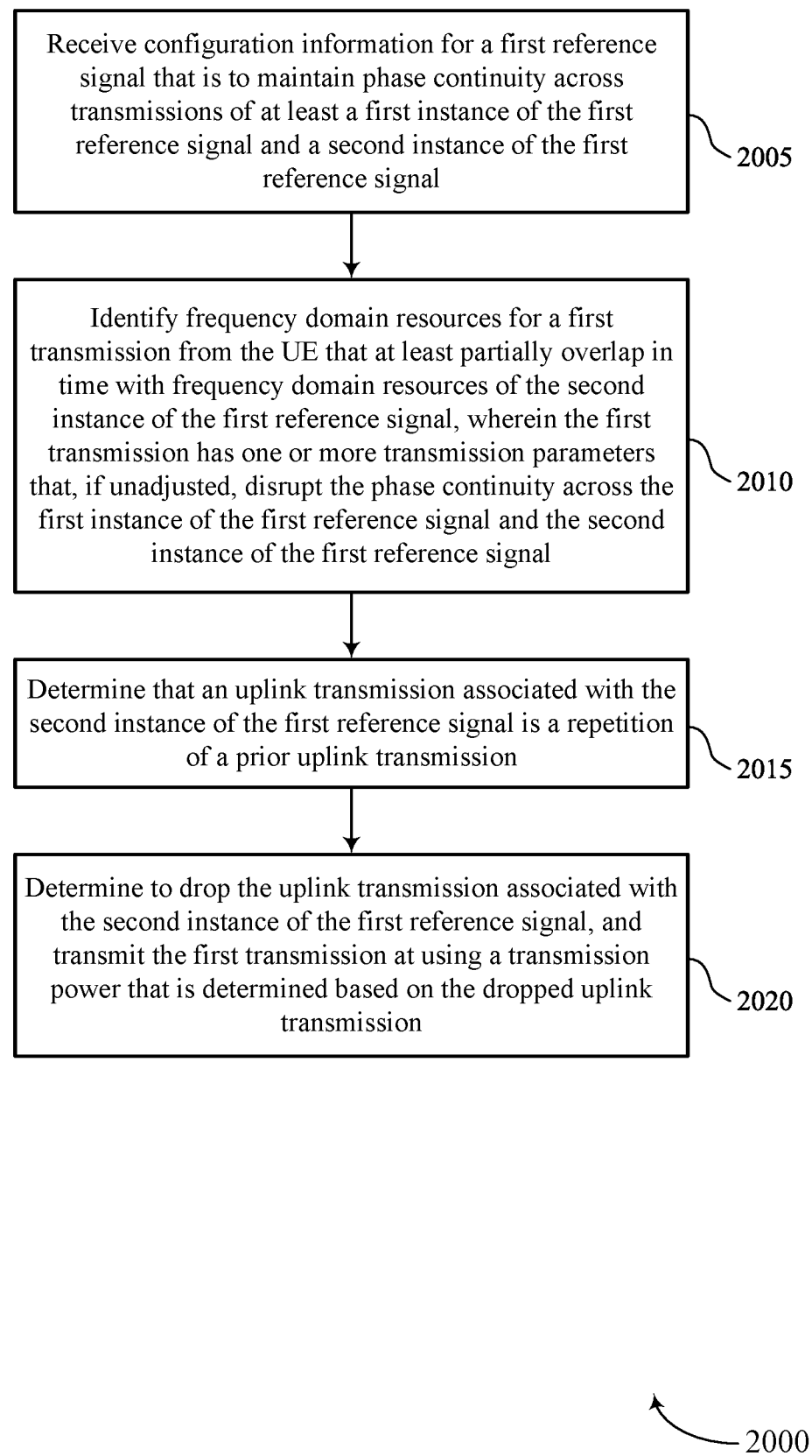

FIG. 20 shows a flowchart illustrating a method 2000 that supports uplink reference signal bundling techniques in wireless communications in accordance with aspects of the present disclosure. The operations of the method 2000 may be implemented by a UE or its components as described herein. For example, the operations of the method 2000 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 2005, the method may include receiving configuration information for a first reference signal that is to maintain phase continuity across transmissions of at least a first instance of the first reference signal and a second instance of the first reference signal. The operations of 2005 may be performed in accordance with examples as disclosed herein. In some examples, aspects of the operations of 2005 may be performed by a configuration manager 925 as described with reference to FIG. 9.

At 2010, the method may include identifying frequency domain resources for a first transmission from the UE that at least partially overlap in time with frequency domain resources of the second instance of the first reference signal, where the first transmission has one or more transmission parameters that, if unadjusted, disrupt the phase continuity across the first instance of the first reference signal and the second instance of the first reference signal. The operations of 2010 may be performed in accordance with examples as disclosed herein. In some examples, aspects of the operations of 2010 may be performed by a scheduling manager 930 as described with reference to FIG. 9.

At 2015, the method may include determining that an uplink transmission associated with the second instance of the first reference signal is a repetition of a prior uplink transmission. The operations of 2015 may be performed in accordance with examples as disclosed herein. In some examples, aspects of the operations of 2015 may be performed by a scheduling manager 930 as described with reference to FIG. 9.

At 2020, the method may include determining to drop the uplink transmission associated with the second instance of the first reference signal, and transmit the first transmission at using a transmission power that is determined based on the dropped uplink transmission. The operations of 2020 may be performed in accordance with examples as disclosed herein. In some examples, aspects of the operations of 2020 may be performed by a scheduling manager 930 as described with reference to FIG. 9.

The following provides an overview of some aspects of the present disclosure:

Aspect 1: A method for wireless communication at a UE, comprising: receiving configuration information for a first reference signal that is to maintain phase continuity across transmissions of at least a first instance of the first reference signal and a second instance of the first reference signal; identifying time domain resources for a first transmission from the UE that are between the first instance of the first reference signal and the second instance of the first reference signal, wherein the first transmission has one or more transmission parameters that disrupt the phase continuity across the first instance of the first reference signal and the second instance of the first reference signal; and determining to transmit the first transmission or drop the first transmission based at least in part on both the identifying and on a time duration between the first instance of the first reference signal and the second instance of the first reference signal.

Aspect 2: The method of aspect 1, wherein the first reference signal is a DMRS associated with one or more data transmissions from the UE.

Aspect 3: The method of any of aspects 1 through 2, wherein the first transmission from the UE is a sidelink transmission from the UE to another UE, or is an uplink transmission from the UE to a base station that has one or more different transmission parameters than the first reference signal.

Aspect 4: The method of any of aspects 1 through 3, wherein the determining comprises: determining to transmit the first transmission based at least in part on the time duration between the first instance of the first reference signal and the second instance of the first reference signal exceeding a time threshold value.

Aspect 5: The method of aspect 4, wherein the phase continuity across the first instance of the first reference signal and the second instance of the first reference signal is not assumed to be maintained when the time duration between the first instance of the first reference signal and the second instance of the first reference signal exceeds the time threshold value.

Aspect 6: The method of any of aspects 1 through 3, wherein the determining comprises: determining to drop the first transmission based at least in part on the time duration between the first instance of the first reference signal and the second instance of the first reference signal being less than or equal to a time threshold value.

Aspect 7: The method of any of aspects 1 through 6, wherein the determining to transmit the first transmission or drop the first transmission is further based at least in part on a priority associated with the first transmission relative to a priority associated with the first reference signal.

Aspect 8: The method of aspect 7, wherein the determining comprises: determining to transmit the first transmission based at least in part on the priority associated with the first transmission, and wherein the phase continuity across the first instance of the first reference signal and the second instance of the first reference signal is not maintained.

Aspect 9: The method of any of aspects 1 through 3, wherein the determining comprises: determining to transmit the first transmission and maintain the phase continuity across the first instance of the first reference signal and the second instance of the first reference signal based at least in part on a capability of the UE.

Aspect 10: The method of any of aspects 1 through 9, wherein the time duration corresponds to a determined number of orthogonal frequency division multiplexing (OFDM) symbols.

Aspect 11: The method of aspect 10, wherein the determined number of OFDM symbols is based at least in part on a time period which the UE will maintain activation of a power amplifier.

Aspect 12: A method for wireless communication at a UE, comprising: receiving configuration information for a first reference signal that is to maintain phase continuity across transmissions of at least a first instance of the first reference signal and a second instance of the first reference signal; identifying frequency domain resources for a first transmission from the UE that at least partially overlap in time with frequency domain resources of the second instance of the first reference signal, wherein the first transmission has one or more transmission parameters that, if unadjusted, disrupt the phase continuity across the first instance of the first reference signal and the second instance of the first reference signal; and determining one or more transmission parameter adjustments of one or more of the first transmission or the second instance of the first reference signal based at least in part on the overlap in time of the frequency domain resources of the first transmission and the second instance of the first reference signal.

Aspect 13: The method of aspect 12, wherein the first transmission from the UE is a sidelink transmission from the UE to another UE, or is an uplink transmission from the UE to a base station.

Aspect 14: The method of any of aspects 12 through 13, wherein the determining comprises: determining a first reference signal power for transmission of both the first instance of the first reference signal and the second instance of the first reference signal, and wherein the first transmission uses a remaining amount of power available after the first reference signal power is used to transmit the second instance of the first reference signal.

Aspect 15: The method of any of aspects 12 through 13, wherein the determining comprises determining to drop the first transmission in order maintain the phase continuity across the first instance of the first reference signal and the second instance of the first reference signal.

Aspect 16: The method of aspect 15, wherein the determining to drop the first transmission is based at least in part on a time duration between the first instance of the first reference signal and the second instance of the first reference signal being less than or equal to a time threshold value.

Aspect 17: The method of any of aspects 12 through 13, wherein the determining comprises: determining to transmit the first transmission based at least in part on a priority associated with the first transmission, and wherein the phase continuity across the first instance of the first reference signal and the second instance of the first reference signal is not maintained.

Aspect 18: The method of aspect 17, further comprising: transmitting an indication to a receiving device that the phase continuity across the first instance of the first reference signal and the second instance of the first reference signal is not maintained.

Aspect 19: The method of any of aspects 12 through 13, wherein the determining the one or more transmission parameter adjustments comprises: determining that an uplink transmission associated with the second instance of the first reference signal is a repetition of a prior uplink transmission; and determining to drop the uplink transmission associated with the second instance of the first reference signal, and transmit the first transmission at using a transmission power that is determined based on the dropped uplink transmission.

Aspect 20: The method of aspect 19, wherein the determining the one or more transmission parameter adjustments further comprises: determining that the first transmission has a higher priority than the uplink transmission associated with the second instance of the first reference signal.

Aspect 21: An apparatus for wireless communication at a UE, comprising a processor; memory coupled with the processor; and instructions stored in the memory and executable by the processor to cause the apparatus to perform a method of any of aspects 1 through 11.

Aspect 22: An apparatus for wireless communication at a UE, comprising at least one means for performing a method of any of aspects 1 through 11.

Aspect 23: A non-transitory computer-readable medium storing code for wireless communication at a UE, the code comprising instructions executable by a processor to perform a method of any of aspects 1 through 11.

Aspect 24: An apparatus for wireless communication at a UE, comprising a processor; memory coupled with the processor; and instructions stored in the memory and executable by the processor to cause the apparatus to perform a method of any of aspects 12 through 20.

Aspect 25: An apparatus for wireless communication at a UE, comprising at least one means for performing a method of any of aspects 12 through 20.

Aspect 26: A non-transitory computer-readable medium storing code for wireless communication at a UE, the code comprising instructions executable by a processor to perform a method of any of aspects 12 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
  receiving configuration information for a first reference signal that is to maintain phase continuity across transmissions of at least a first instance of the first reference signal and a second instance of the first reference signal;
  identifying time domain resources for a first transmission from the UE that are between the first instance of the first reference signal and the second instance of the first reference signal, wherein the first transmission has one or more transmission parameters that disrupt the phase continuity across the first instance of the first reference signal and the second instance of the first reference signal; and
  determining to transmit the first transmission or drop the first transmission based at least in part on both the identifying and on a time duration between the first instance of the first reference signal and the second instance of the first reference signal.

2. The method of claim 1, wherein the first reference signal is a demodulation reference signal (DMRS) associated with one or more data transmissions from the UE.

3. The method of claim 1, wherein the first transmission from the UE is a sidelink transmission from the UE to another UE, or is an uplink transmission from the UE to a base station that has one or more different transmission parameters than the first reference signal.

4. The method of claim 1, wherein the determining comprises:
  determining to transmit the first transmission based at least in part on the time duration between the first instance of the first reference signal and the second instance of the first reference signal exceeding a time threshold value.

5. The method of claim 4, wherein the phase continuity across the first instance of the first reference signal and the second instance of the first reference signal is not assumed to be maintained when the time duration between the first instance of the first reference signal and the second instance of the first reference signal exceeds the time threshold value.

6. The method of claim 1, wherein the determining comprises:
  determining to drop the first transmission based at least in part on the time duration between the first instance of the first reference signal and the second instance of the first reference signal being less than or equal to a time threshold value.

7. The method of claim 1, wherein the determining to transmit the first transmission or drop the first transmission is further based at least in part on a priority associated with the first transmission relative to a priority associated with the first reference signal.

8. The method of claim 7, wherein the determining comprises:
  determining to transmit the first transmission based at least in part on the priority associated with the first transmission, and wherein the phase continuity across the first instance of the first reference signal and the second instance of the first reference signal is not maintained.

9. The method of claim 1, wherein the determining comprises:
  determining to transmit the first transmission and maintain the phase continuity across the first instance of the first reference signal and the second instance of the first reference signal based at least in part on a capability of the UE.

10. The method of claim 1, wherein the time duration corresponds to a determined number of orthogonal frequency division multiplexing (OFDM) symbols.

11. The method of claim 10, wherein the determined number of OFDM symbols is based at least in part on a time period which the UE will maintain activation of a power amplifier.

12. A method for wireless communication at a user equipment (UE), comprising:
  receiving configuration information for a first reference signal that is to maintain phase continuity across transmissions of at least a first instance of the first reference signal and a second instance of the first reference signal;
  identifying frequency domain resources for a first transmission from the UE that at least partially overlap in time with frequency domain resources of the second instance of the first reference signal, wherein the first transmission has one or more transmission parameters that, if unadjusted, disrupt the phase continuity across the first instance of the first reference signal and the second instance of the first reference signal; and
  determining one or more transmission parameter adjustments of one or more of the first transmission or the second instance of the first reference signal based at least in part on the overlap in time of the frequency domain resources of the first transmission and the second instance of the first reference signal.

13. The method of claim 12, wherein the first transmission from the UE is a sidelink transmission from the UE to another UE, or is an uplink transmission from the UE to a base station.

14. The method of claim 12, wherein the determining comprises:
  determining a first reference signal power for transmission of both the first instance of the first reference signal and the second instance of the first reference signal, and wherein the first transmission uses a remaining amount of power available after the first reference signal power is used to transmit the second instance of the first reference signal.

15. The method of claim 12, wherein the determining comprises determining to drop the first transmission in order maintain the phase continuity across the first instance of the first reference signal and the second instance of the first reference signal.

16. The method of claim 15, wherein the determining to drop the first transmission is based at least in part on a time duration between the first instance of the first reference signal and the second instance of the first reference signal being less than or equal to a time threshold value.

17. The method of claim 12, wherein the determining comprises:
determining to transmit the first transmission based at least in part on a priority associated with the first transmission, and wherein the phase continuity across the first instance of the first reference signal and the second instance of the first reference signal is not maintained.

18. The method of claim 17, further comprising:
transmitting an indication to a receiving device that the phase continuity across the first instance of the first reference signal and the second instance of the first reference signal is not maintained.

19. The method of claim 12, wherein the determining the one or more transmission parameter adjustments comprises:
determining that an uplink transmission associated with the second instance of the first reference signal is a repetition of a prior uplink transmission; and
determining to drop the uplink transmission associated with the second instance of the first reference signal, and transmit the first transmission at using a transmission power that is determined based on the dropped uplink transmission.

20. The method of claim 19, wherein the determining the one or more transmission parameter adjustments further comprises:
determining that the first transmission has a higher priority than the uplink transmission associated with the second instance of the first reference signal.

21. An apparatus for wireless communication at a user equipment (UE), comprising:
a processor;
memory coupled with the processor; and
instructions stored in the memory and executable by the processor to cause the apparatus to:
receive configuration information for a first reference signal that is to maintain phase continuity across transmissions of at least a first instance of the first reference signal and a second instance of the first reference signal;
identify time domain resources for a first transmission from the UE that are between the first instance of the first reference signal and the second instance of the first reference signal, wherein the first transmission has one or more transmission parameters that disrupt the phase continuity across the first instance of the first reference signal and the second instance of the first reference signal; and
determine to transmit the first transmission or drop the first transmission based at least in part on both the identification of the time domain resources and on a time duration between the first instance of the first reference signal and the second instance of the first reference signal.

22. The apparatus of claim 21, wherein the first reference signal is a demodulation reference signal (DMRS) associated with one or more data transmissions from the UE.

23. The apparatus of claim 21, wherein the first transmission from the UE is a sidelink transmission from the UE to another UE, or is an uplink transmission from the UE to a base station that has one or more different transmission parameters than the first reference signal.

24. The apparatus of claim 21, wherein the instructions to determine are executable by the processor to cause the apparatus to:
determine to transmit the first transmission based at least in part on the time duration between the first instance of the first reference signal and the second instance of the first reference signal exceeding a time threshold value.

25. The apparatus of claim 24, wherein the phase continuity across the first instance of the first reference signal and the second instance of the first reference signal is not assumed to be maintained when the time duration between the first instance of the first reference signal and the second instance of the first reference signal exceeds the time threshold value.

26. The apparatus of claim 21, wherein the instructions to determine are executable by the processor to cause the apparatus to:
determine to drop the first transmission based at least in part on the time duration between the first instance of the first reference signal and the second instance of the first reference signal being less than or equal to a time threshold value.

27. An apparatus for wireless communication at a user equipment (UE), comprising:
a processor;
memory coupled with the processor; and
instructions stored in the memory and executable by the processor to cause the apparatus to:
receive configuration information for a first reference signal that is to maintain phase continuity across transmissions of at least a first instance of the first reference signal and a second instance of the first reference signal;
identify frequency domain resources for a first transmission from the UE that at least partially overlap in time with frequency domain resources of the second instance of the first reference signal, wherein the first transmission has one or more transmission parameters that, if unadjusted, disrupt the phase continuity across the first instance of the first reference signal and the second instance of the first reference signal; and
determine one or more transmission parameter adjustments of one or more of the first transmission or the second instance of the first reference signal based at least in part on the overlap in time of the frequency domain resources of the first transmission and the second instance of the first reference signal.

28. The apparatus of claim 27, wherein the first transmission from the UE is a sidelink transmission from the UE to another UE, or is an uplink transmission from the UE to a base station.

29. The apparatus of claim 27, wherein the instructions to determine are executable by the processor to cause the apparatus to:
determine a first reference signal power for transmission of both the first instance of the first reference signal and the second instance of the first reference signal, and wherein the first transmission uses a remaining amount of power available after the first reference signal power is used to transmit the second instance of the first reference signal.

30. The apparatus of claim 27, wherein the determining comprises determining to drop the first transmission in order maintain the phase continuity across the first instance of the first reference signal and the second instance of the first reference signal.

* * * * *